(12) United States Patent
Aizawa

(10) Patent No.: US 11,556,739 B2
(45) Date of Patent: Jan. 17, 2023

(54) METHOD FOR ESTIMATING OPERATION OF WORK VEHICLE, SYSTEM, METHOD FOR PRODUCING TRAINED CLASSIFICATION MODEL, TRAINING DATA, AND METHOD FOR PRODUCING TRAINING DATA

(71) Applicant: KOMATSU LTD., Tokyo (JP)

(72) Inventor: Masanori Aizawa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 16/500,028

(22) PCT Filed: Oct. 26, 2018

(86) PCT No.: PCT/JP2018/039830
§ 371 (c)(1),
(2) Date: Oct. 1, 2019

(87) PCT Pub. No.: WO2019/093152
PCT Pub. Date: May 16, 2019

(65) Prior Publication Data
US 2020/0050890 A1 Feb. 13, 2020

(30) Foreign Application Priority Data

Nov. 10, 2017 (JP) ............................. JP2017-217287

(51) Int. Cl.
*G06K 9/00* (2022.01)
*G06K 9/62* (2022.01)
(Continued)

(52) U.S. Cl.
CPC ........... *G06K 9/6256* (2013.01); *G06V 20/20* (2022.01); *G06V 20/41* (2022.01); *G06V 20/56* (2022.01)

(58) Field of Classification Search
CPC ............ G06K 9/6256; G06K 9/00671; G06K 9/00718; G06K 9/006791; G06V 9/6256;
(Continued)

(56) References Cited

U.S. PATENT DOCUMENTS

| | | | | |
|---|---|---|---|---|
| 5,999,872 A | * | 12/1999 | Kinugawa | E02F 9/2025 172/4 |
| 10,514,694 B1 | * | 12/2019 | Mundhenk | G06N 20/10 |
| 2006/0034535 A1 | * | 2/2006 | Koch | H04N 5/272 382/284 |

(Continued)

FOREIGN PATENT DOCUMENTS

| | | |
|---|---|---|
| CN | 106125612 A | 11/2016 |
| JP | 10-60948 A | 3/1998 |

(Continued)

OTHER PUBLICATIONS

The International Search Report for the corresponding international application No. PCT/JP2018/039830, dated Dec. 25, 2018.
(Continued)

*Primary Examiner* — Md K Talukder
(74) *Attorney, Agent, or Firm* — Global IP Counselors, LLP

(57) ABSTRACT

A method is performed by a computer. The method includes obtaining motion data indicating a motion change of a work vehicle, and determining an operation classification of the work vehicle from the motion data by performing image classification using a trained classification model. The motion data is generated from a plurality of images indicating the work vehicle in operation in time series.

26 Claims, 21 Drawing Sheets

(51) Int. Cl.
*G06V 20/20* (2022.01)
*G06V 20/40* (2022.01)
*G06V 20/56* (2022.01)

(58) Field of Classification Search
CPC ........ G06V 20/20; G06V 20/41; G06V 20/56; G06V 10/82; G06V 20/38; G06V 40/20; G06T 7/20; G06T 3/40; G06T 5/50; G06T 2207/10016; G06T 2207/20081; G06T 2207/20084; G06N 3/08
See application file for complete search history.

(56) References Cited

U.S. PATENT DOCUMENTS

| | | | |
|---|---|---|---|
| 2011/0211732 A1* | 9/2011 | Rapaport | G09G 5/06 382/173 |
| 2013/0016877 A1* | 1/2013 | Feris | G06T 7/73 382/103 |
| 2015/0278638 A1 | 10/2015 | Kang | |
| 2016/0247304 A1* | 8/2016 | Sakiyama | G06T 13/20 |
| 2017/0076224 A1* | 3/2017 | Munawar | G06N 3/0454 |
| 2018/0107901 A1* | 4/2018 | Nakamura | G06V 10/776 |
| 2018/0165502 A1* | 6/2018 | Mianzo | G06T 7/75 |
| 2018/0313061 A1* | 11/2018 | Cai | G07C 3/08 |
| 2018/0323816 A1* | 11/2018 | Chaston | H01Q 1/40 |
| 2018/0347479 A1* | 12/2018 | Nakamura | F02D 41/021 |
| 2019/0266487 A1* | 8/2019 | Chollet | G06V 10/454 |
| 2019/0332939 A1* | 10/2019 | Alletto | G06N 3/0454 |
| 2020/0050890 A1* | 2/2020 | Aizawa | G06K 9/6256 |
| 2020/0173791 A1* | 6/2020 | Misaki | G06Q 10/06 |
| 2020/0277756 A1 | 9/2020 | Hou et al. | |

FOREIGN PATENT DOCUMENTS

| | | |
|---|---|---|
| JP | 10-290450 A | 10/1998 |
| JP | 2002-298143 A | 10/2002 |
| JP | 2013-161192 A | 8/2013 |
| JP | 2016-103301 A | 6/2016 |
| KR | 10-1441107 B1 | 9/2014 |

OTHER PUBLICATIONS

Sign Language Recognition by Convolutional Neural Network with Concatenated Frame Image of Depth Image, IEICE Technical Report: Oct. 9, 2016, vol. 116, No. 248, pp. 17-22 by Hashimura, Keisuke, Saitoh, Takeshi.

WirelessWire News (online), Sep. 30, 2016: Internet: URL: https://wirelesswire.jp/2016/09/5657: non-official translation ("Distillation" for Dramatically Raising the Efficiency of Deep Neural Networks.) by Shimizu, Ryo.

The Office Action for the corresponding Chinese application No. 201880021484.4, dated Sep. 15, 2022.

The Office Action of the corresponding German application No. 11 2018 001 587.4, dated Nov. 23, 2022.

Ruxiao Bao. "Characterizing Construction Equipment Activities in Long Video Sequences Of Earthmoving Operations Via Kinematic Features"; Masterarbeit, University of Illinois at Urbana-Champaign, Aug. 12, 2015; URL: http://hdl.handle.net/2142/89233.

Sebastien C. Wong et al. "Understanding Data Augmentation For Classification: When To Warp?" in 2016 International Conference On Digital Computing: Techniques And Applications (DICTA). IEEE, Nov. 26, 2016. S.1-6.

* cited by examiner

IM21

IM22

METHOD FOR ESTIMATING OPERATION OF WORK VEHICLE, SYSTEM, METHOD FOR PRODUCING TRAINED CLASSIFICATION MODEL, TRAINING DATA, AND METHOD FOR PRODUCING TRAINING DATA

CROSS-REFERENCE TO RELATED APPLICATIONS

This application is a U.S. National stage application of International Application No. PCT/JP2018/039830, filed on Oct. 26, 2018. This U.S. National stage application claims priority under 35 U.S.C. § 119(a) to Japanese Patent Application No. 2017-217287, filed in Japan on Nov. 10, 2017, the entire contents of which are hereby incorporated herein by reference.

BACKGROUND

Field of the Invention

The present invention relates to a method for estimating an operation of a work vehicle using artificial intelligence, a system, a method for producing a trained classification model, training data, and a method for producing training data.

Background Information

Conventionally, a technique for estimating an operation performed by a work vehicle using a computer is known. For example, a hydraulic excavator performs operations such as excavation, turning, or discharging. In Japan Laid-open Patent Application Publication No. 2016-103301, a controller determines these operations of a hydraulic excavator based on detection values from a sensor provided in the hydraulic excavator. For example, a hydraulic excavator includes a rotation speed sensor, a pressure sensor, and a plurality of angle sensors. The rotational speed sensor detects the rotational speed of the engine. The pressure sensor detects the discharge pressure of the hydraulic pump. The plurality of angle sensors detect a boom angle, an arm angle, and a bucket angle. The controller determines the operation being performed by the excavator based on the detection values from these sensors.

SUMMARY

However, with the above technique, it is not possible to determine the operation of a work vehicle that does not include a sensor. Also, even if a work vehicle is equipped with a sensor, a computer cannot obtain the information detected by the sensor from the work vehicle unless the work vehicle includes a communication device with the computer. Accordingly, in this case, the operation of the work vehicle cannot be determined by the computer.

Moreover, when determining the operation of each work vehicle in order to manage a plurality of the work vehicles arranged at the work site, not all work vehicles are provided with the communication device with a sensor or a computer. Therefore, it is not easy to determine the operation of each work vehicle in order to manage a plurality of the work vehicles arranged at the work site.

On the other hand, in recent years, a technique has been researched in which a computer determines what kind of operation is being performed by analyzing, using artificial intelligence, a video obtained by capturing the motion of a person or an object. For example, a recurrent neural network (RNN) or the like has been studied as an artificial intelligence model for handling videos. If it is possible to analyze the video taken the operation of the work vehicle using such artificial intelligence techniques, it is possible to easily determine the operation of the work vehicle by a computer. However, it is still difficult to put into practical use an artificial intelligence model that directly handles videos as described above due to problems such as recognition accuracy.

An object of the present invention is to easily and accurately determine the operation of a work vehicle using artificial intelligence.

A first aspect is a method executed by a computer, and includes the following processing. A first process is obtaining motion data. The motion data is data indicating a motion change of the work vehicle generated from a plurality of images showing a work vehicle in operation in time series. A second process is determining an operation classification of the work vehicle from the motion data by executing image classification using a trained classification model.

A second aspect is a system that includes a trained classification model and a processor. The processor is programmed to perform the following processing. The processor obtains motion data. The motion data is data indicating a motion change of the work vehicle generated from a plurality of images showing the work vehicle in operation in time series. The processor determines an operation classification of the work vehicle from the motion data by executing image classification using the classification model.

A third aspect is a method for producing a trained classification model, which includes the following processes. A first process is obtaining training data. The training data includes motion data and an operation classification of a work vehicle assigned to the motion data. The motion data is data indicating a motion change of the work vehicle generated from a plurality of images showing the work vehicle in operation in time series. A second process is training the classification model from the training data.

A fourth aspect is training data for training a classification model, and includes motion data and an operation classification of the work vehicle assigned to the motion data. The motion data is data indicating a motion change of the work vehicle generated from a plurality of images showing the work vehicle in operation in time series.

A fifth aspect is a method for producing a training data for training a classification model, and includes the following processes. A first process is obtaining a plurality of images which shows a work vehicle in operation in time series. A second process is generating motion data indicating a motion change of the work vehicle from the plurality of images. A third process is obtaining an operation classification of the work vehicle assigned to the motion data.

A sixth aspect is a method for producing a trained classification model, and includes the following processing. A first process is obtaining motion data. The motion data is data indicating a motion change of a work vehicle generated from a plurality of images showing the work vehicle in operation in time series. A second process is determining an operation classification of the work vehicle from the motion data by executing image classification using a trained first classification model. A third process is training a second classification model by a training data including the motion data and the determined operation classification of the work vehicle.

Advantageous Effects of Invention

In the present invention, an operation classification of a work vehicle is determined from motion data generated from a plurality of images. Therefore, an operation of the work vehicle can be estimated using an artificial intelligence classification model suitable for still image classification, Thereby, the operation of the work vehicle can be easily and accurately determined using artificial intelligence.

DETAILED DESCRIPTION OF EMBODIMENT(S)

Figure 1:
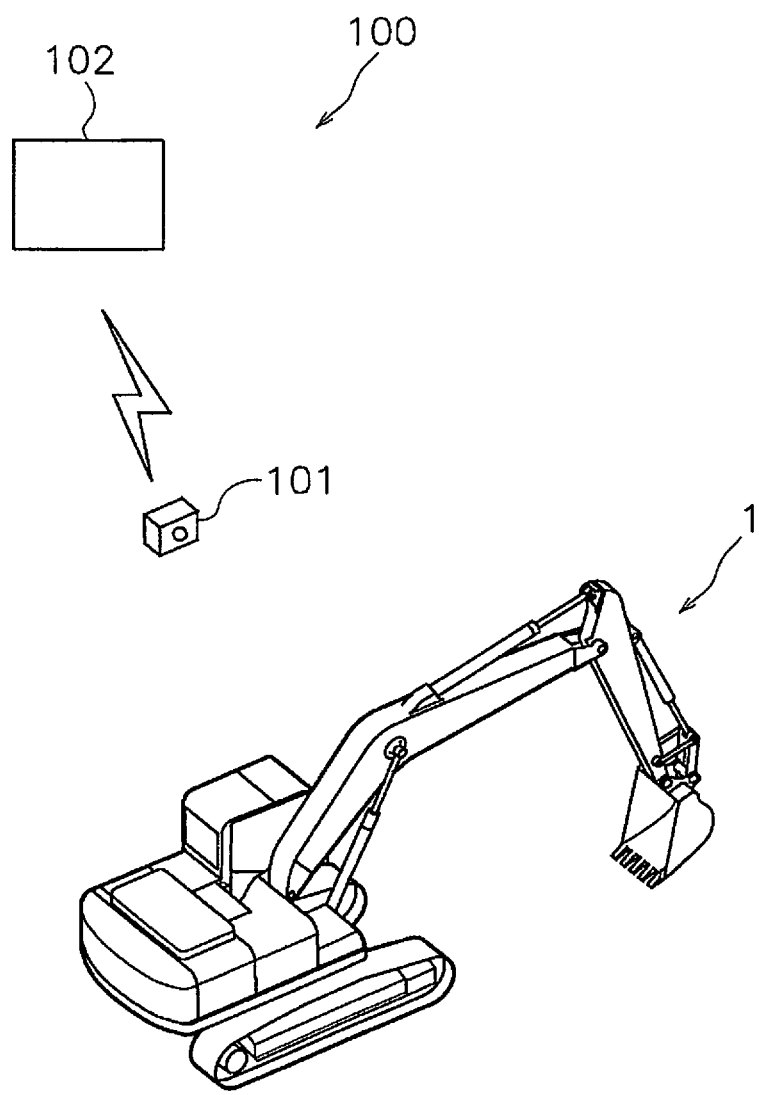
FIG. 1 is a schematic diagram showing a classification system according to an embodiment.

Hereinafter, embodiments will be described with reference to the drawings. FIG. 1 is a schematic diagram illustrating a classification system 100 according to the embodiment. The classification system 100 is a system for estimating an operation performed by the work vehicle 1. As illustrated in FIG. 1, the classification system 100 includes a camera 101 and a computer 102.

The camera 101 is disposed at a work site where the work vehicle 1 is disposed. The camera 101 shoots the work vehicle 1 from the outside of the work vehicle 1 and captures video of the work vehicle 1. The computer 102 communicates with the camera 101 wirelessly or by wire. The camera 101 transmits video data indicating the captured video to the computer 102. The computer 102 may receive the video data from the camera 101 via a communication network. The computer 102 may receive the video data from the camera 101 via a recording medium.

The computer 102 may be located at a work site. Alternatively, the computer 102 may be located at a control center remote from the work site. The computer 102 may be designed exclusively for the classification system 100 or may be a general-purpose PC (Personal Computer). The computer 102 receives the video data from the camera 101. The computer 102 determines the operation classification of the work vehicle 1 by using an artificial intelligence classification model.

The classification system 100 may have a plurality of cameras 101. The plurality of cameras 101 may shoot videos of a plurality of work vehicles 1. The computer 102 may receive video data from each of the plurality of cameras 101.

Figure 2:
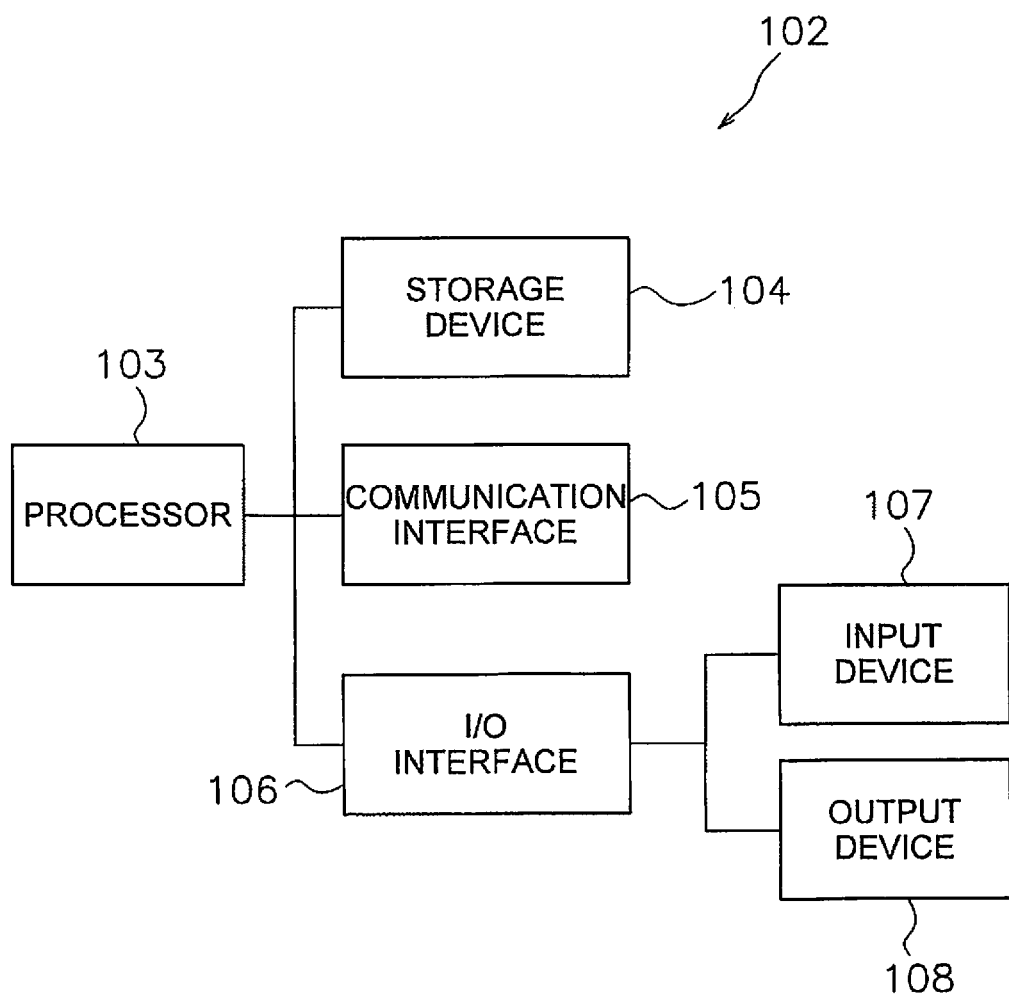
FIG. 2 is a schematic diagram showing a configuration of a computer of the classification system.

FIG. 2 is a schematic diagram illustrating the configuration of the computer 102. As illustrated in FIG. 2, the computer 102 includes a processor 103, a storage device 104, a communication interface 105, and an I/O interface 106. The processor 103 is, for example, a CPU (Central Processing Unit). The storage device 104 includes a medium for recording information such as recorded programs and data so that the processor 103 can read the information. The storage device 104 includes a system memory such as a RAM (Random Access Memory) or a ROM (Read Only Memory), and an auxiliary storage device. The auxiliary storage device may be a magnetic recording medium such as a hard disk, an optical recording medium such as a CD or a DVD, or a semiconductor memory such as a flash memory. The storage device 104 may be built in the computer 102. The storage device 104 may include an external recording medium that is detachably connected to the computer 102.

The communication interface 105 is, for example, a wired LAN (Local Area Network) module or a wireless LAN module, and is an interface for performing communication via a communication network. The I/O interface 106 is, for example, a USB (Universal Serial Bus) port or the like, and is an interface for connecting to an external device.

The computer 102 is connected to an input device 107 and an output device 108 via an I/O interface 106. The input device 107 is a device for a user to input to the computer 102. The input device 107 includes, for example, a pointing device such as a mouse or a trackball. The input device 107 may include a device for character input such as a keyboard. The output device 108 includes a display, for example.

Figure 3:
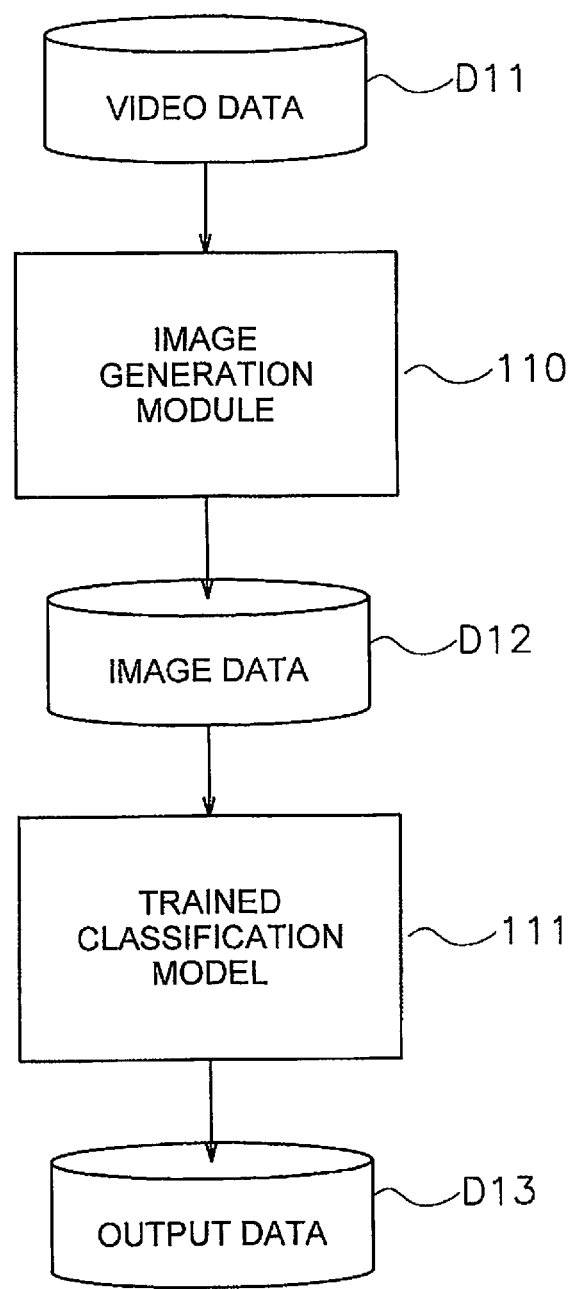
FIG. 3 is a schematic diagram showing a configuration of the classification system mounted on a computer.

FIG. 3 is a diagram illustrating a part of the configuration of the classification system 100. As illustrated in FIG. 3, the classification system 100 includes an image generation module 110 and a trained classification model 111. The image generation module 110 and the trained classification model 111 are implemented in the computer 102. The image generation module 110 and the trained classification model 111 may be stored in the storage device 104 of the computer.

In the present embodiment, the modules and models may be implemented in hardware, software executable on hardware, firmware, or a combination thereof. Modules and models may include programs, algorithms, and data executed by the processor. Module and model functions may be performed by a single module or may be distributed across multiple modules. Modules and models may be distributed and arranged in a plurality of computers.

The image generation module 110 generates image data D12 indicating a superimposed image, which will be described later, from the video data D11 of the work vehicle 1. The superimposed image is an image obtained by superimposing a series of a plurality of images showing the work vehicle 1 in operation in time series. The "image" here means a still image. The "series of images" is not limited to a plurality of images of completely continuous frames included in a video, but includes a plurality of images obtained by skipping a predetermined number of frames.

The classification model 111 is an artificial intelligence model for image classification. The classification model 111 analyzes the input image and outputs a classification corresponding to the image. As will be described later, the computer 102 executes the image classification using the artificial intelligence classification model 111 on the superimposed image indicated by the image data D12, thereby determining the operation classification of the work vehicle 1. The classification model 111 outputs output data D13 indicating the determined operation classification.

Figure 4:
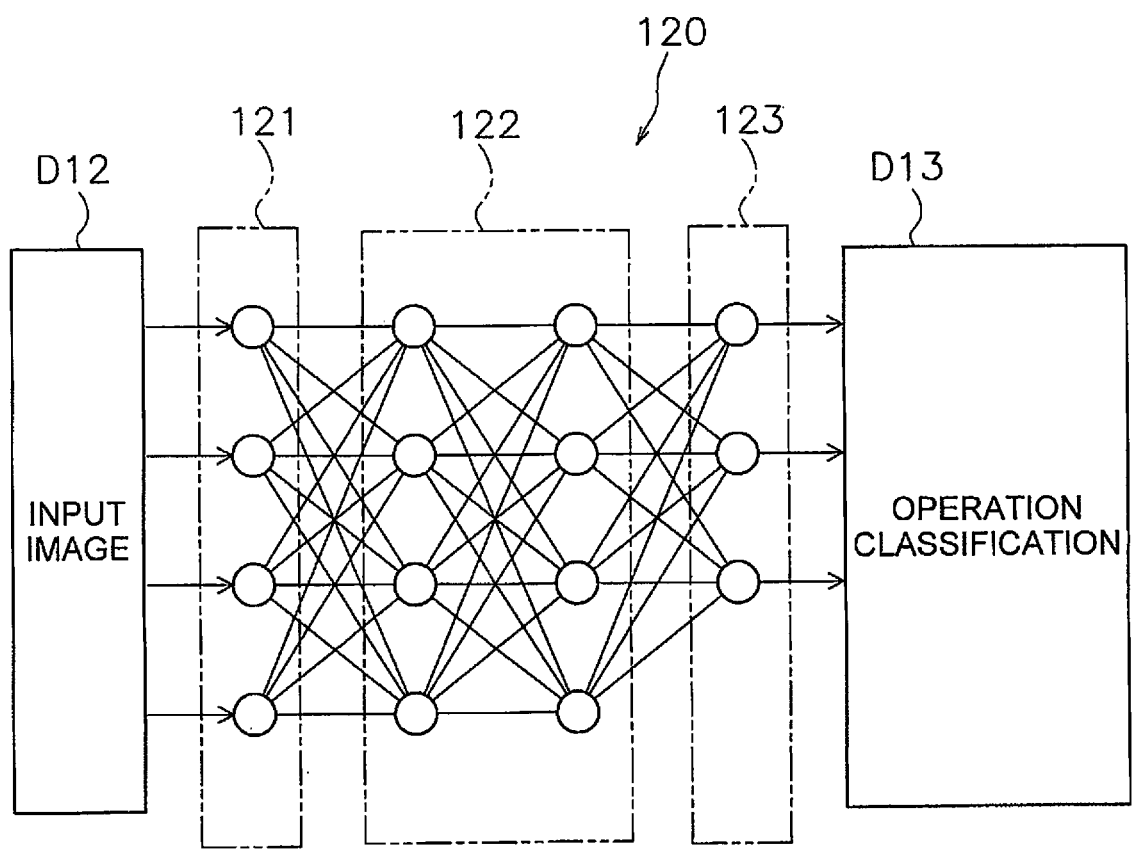
FIG. 4 is a schematic diagram showing a configuration of a neural network.

The classification model 111 includes the neural network 120 illustrated in FIG. 4. For example, the classification model 111 includes a deep neural network such as a convolutional neural network (CNN).

As illustrated in FIG. 4, the neural network 120 includes an input layer 121, an intermediate layer 122 (hidden layer), and an output layer 123. Each layer 121, 122, 123 includes one or more neurons. For example, the number of neurons in the input layer 121 can be set according to the number of pixels in the superimposed image. The number of neurons in the intermediate layer 122 can be set as appropriate. The output layer 123 can be set according to the number of operation classification of the work vehicle 1.

The neurons in adjacent layers are connected to each other, and a weight (connection load) is set for each connection. The number of neurons connected may be set as appropriate. A threshold value is set for each neuron, and an output value of each neuron is determined depending on whether or not the sum of products of input values and weights for each neuron exceeds the threshold value.

The input layer 121 receives motion data indicating the motion of the work vehicle 1. The motion data is data generated from a plurality of images showing the work vehicle in operation in time series, and indicates the motion change of the work vehicle. The motion data will be described later. An output value indicating the probability of each classified operation is output to the output layer 123. The classification model 111 has been trained to output an output value indicating the probability of each classified operation when the motion data is input. The trained parameters of the classification model 111 obtained by learning are stored in the storage device 104. The trained parameters include, for example, the number of layers of the neural network 120, the number of neurons in each layer, the connection relationship between neurons, the connection weight between each neuron, and the threshold value of each neuron.

Note that the classification of each operation may be determined according to the type of the work vehicle 1. For example, when the work vehicle 1 is a hydraulic excavator, the operation classification may include "excavation", "turning", and "discharging". The "turning" may include "hoist turning" and "down turning". However, a part of the operation classification may be changed or omitted. Alternatively, the operation classification may further include other classifications.

Figure 5:
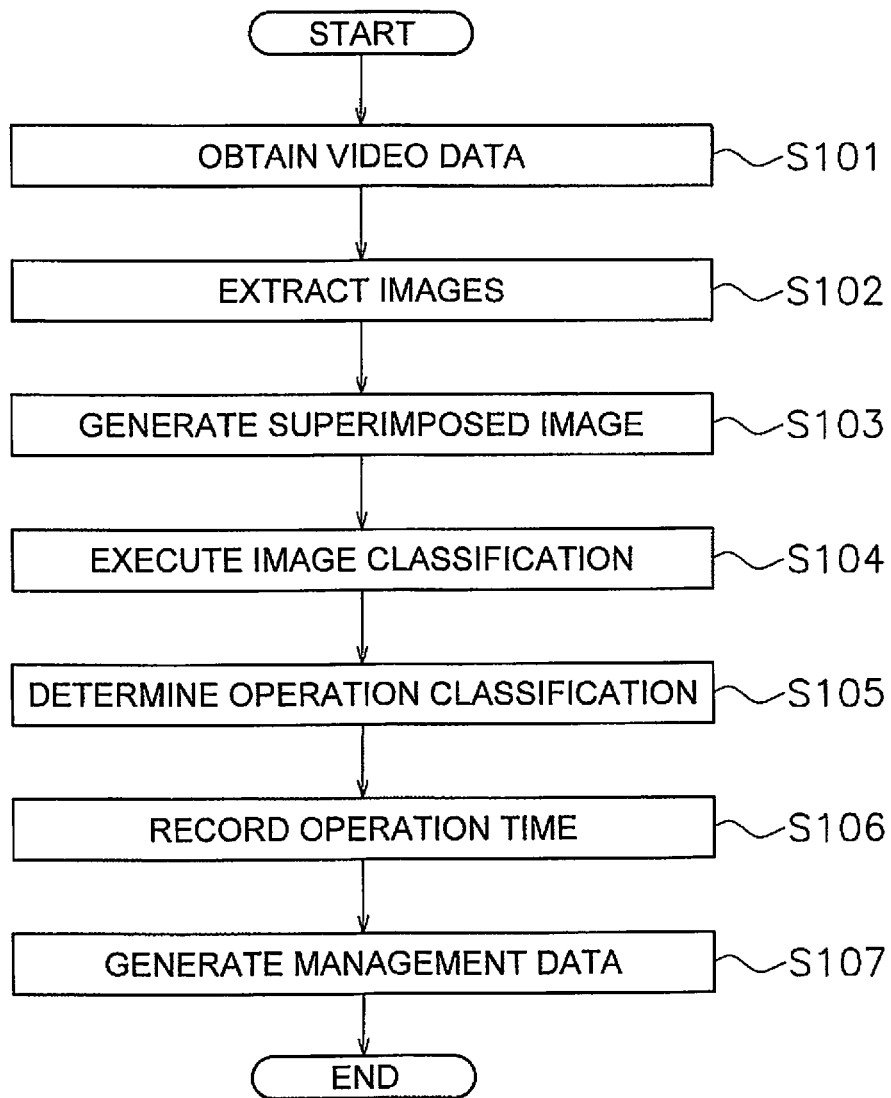
FIG. 5 is a flowchart showing a process for estimating an operation of a work vehicle.

FIG. 5 is a flowchart showing a process executed by the computer 102 (processor 103) in order to estimate the operation of the work vehicle 1. As illustrated in FIG. 5, in step S101, the computer 102 obtains video data D11 of the work vehicle 1 captured by the camera 101. The computer 102 may obtain the video data D11 captured by the camera 101 in real time. Alternatively, the computer 102 may obtain the video data D11 captured by the camera 101 at a predetermined time or every predetermined period of time. The computer 102 stores the video data D11 in the storage device 104.

Figure 6:
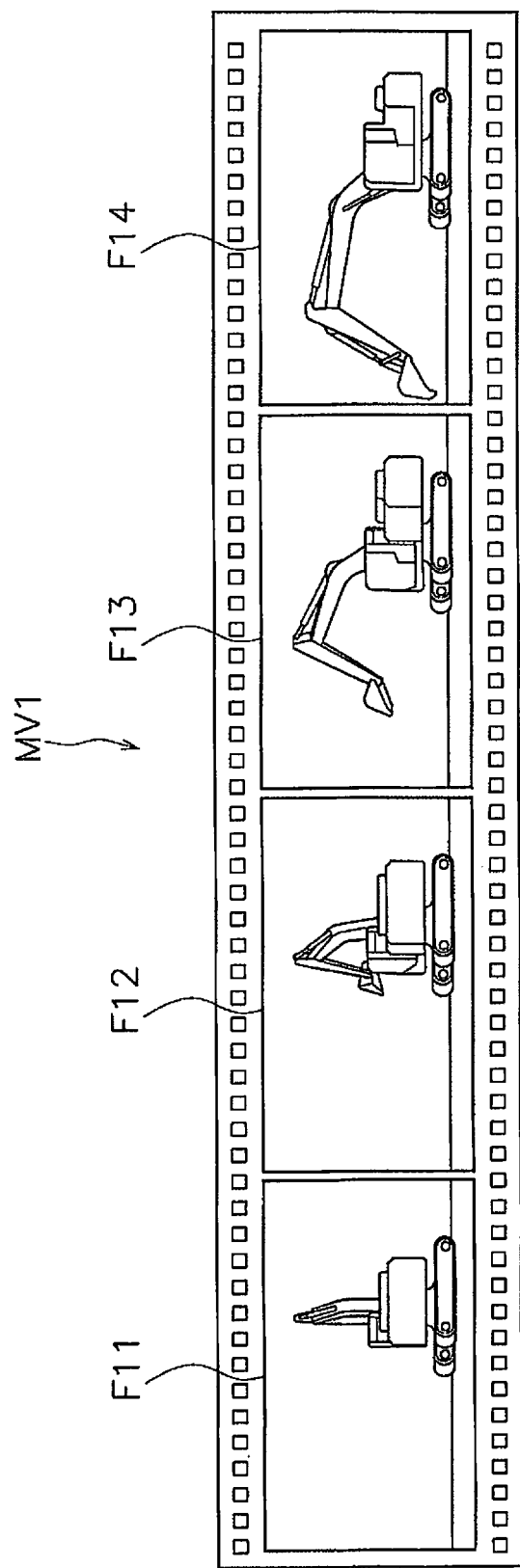
FIG. 6 is a diagram illustrating an example of a plurality of images included in video data.

In step S102, the computer 102 extracts a series of a plurality of images indicating the motion of the work vehicle 1 from the video data D11. FIG. 6 is a diagram illustrating a plurality of images included in an example of the video data D11 (hereinafter referred to as "video data MV1"). FIG. 6 illustrates only a part of the plurality of images (images F11 to F14) included in the video data MV1. The computer 102 extracts a predetermined number of frames from a plurality of images F11-F14 included in the video data MV1.

In step S103, the computer 102 superimposes the extracted images to generate a superimposed image. The superimposed image is an example of motion data indicating the motion change of the work vehicle described above. The computer 102 generates a superimposed image by transmitting a plurality of images and overlaying them. The superimposed image is a still image synthesized by superimposing a plurality of images extracted from a video. The computer 102 stores image data D12 indicating the superimposed image in the storage device 104.

Figure 7:
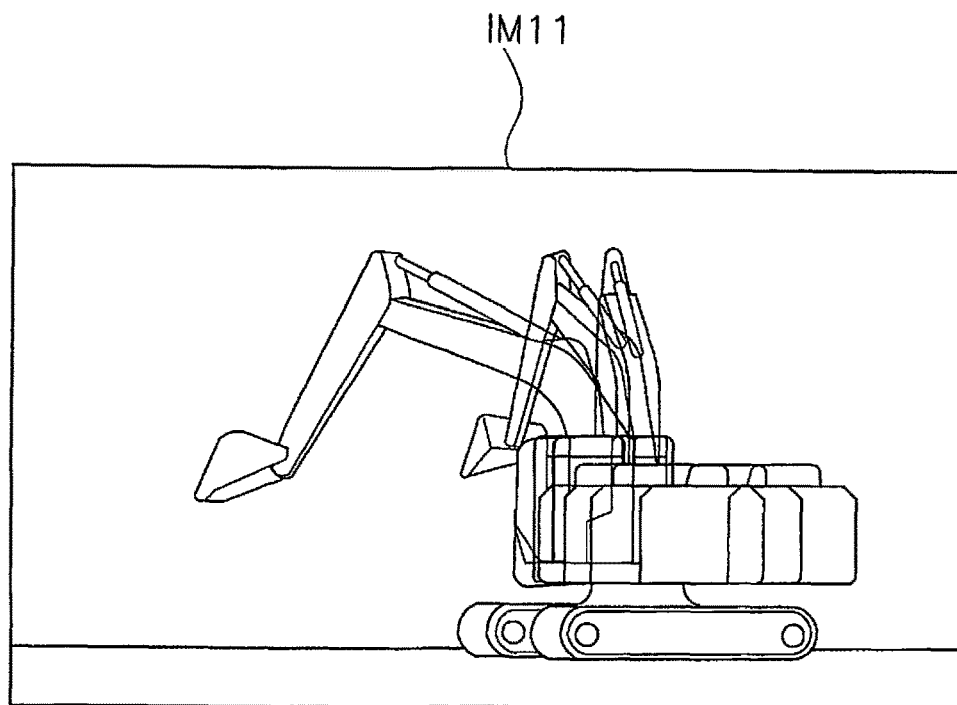
FIG. 7 is a diagram illustrating an example of a superimposed image obtained by superimposing first to third images included in the video data illustrated in FIG. 6.
Figure 8:
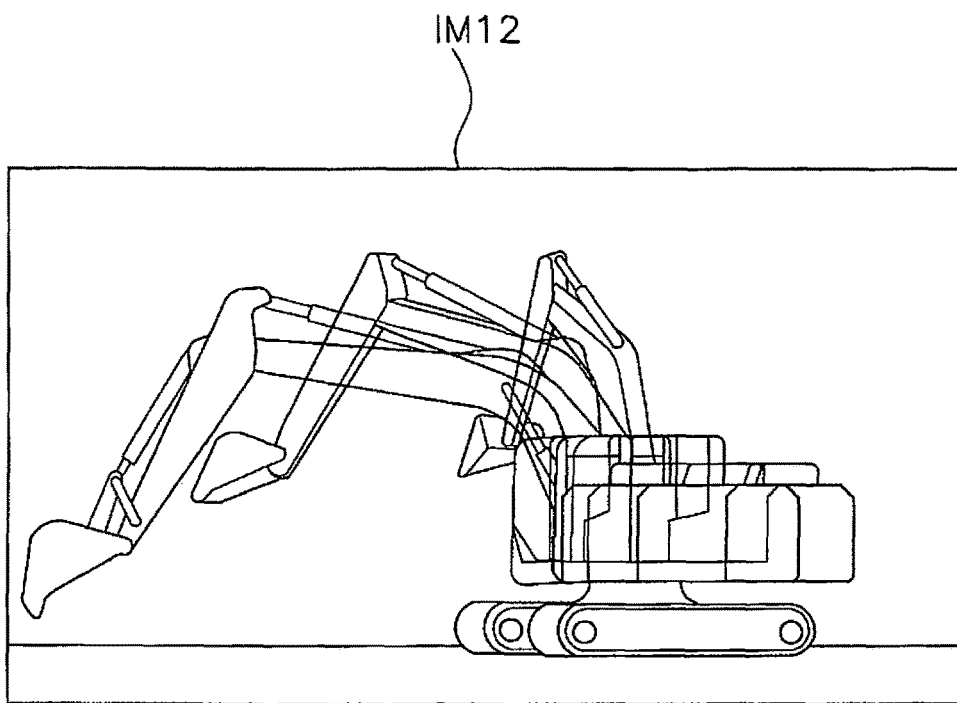
FIG. 8 is a diagram showing an example of a superimposed image obtained by superimposing the second to fourth images included in the video data illustrated in FIG. 6.

FIG. 7 is a diagram illustrating an example of a superimposed image IM11 obtained by superimposing the first to third images F11 to F13 included in the video data MV1 illustrated in FIG. 6. FIG. 8 is a diagram illustrating an example of a superimposed image IM12 obtained by superimposing the second to fourth images F12 to F14 included in the video data MV1 illustrated in FIG. 6. The video data MV1 illustrated in FIG. 6 is obtained by shooting the work vehicle 1 that is turning. As illustrated in FIGS. 7 and 8, in the superimposed images IM11 and IM12, a plurality of different postures of the turning work vehicle 1 are illustrated in one still image.

Figure 9:
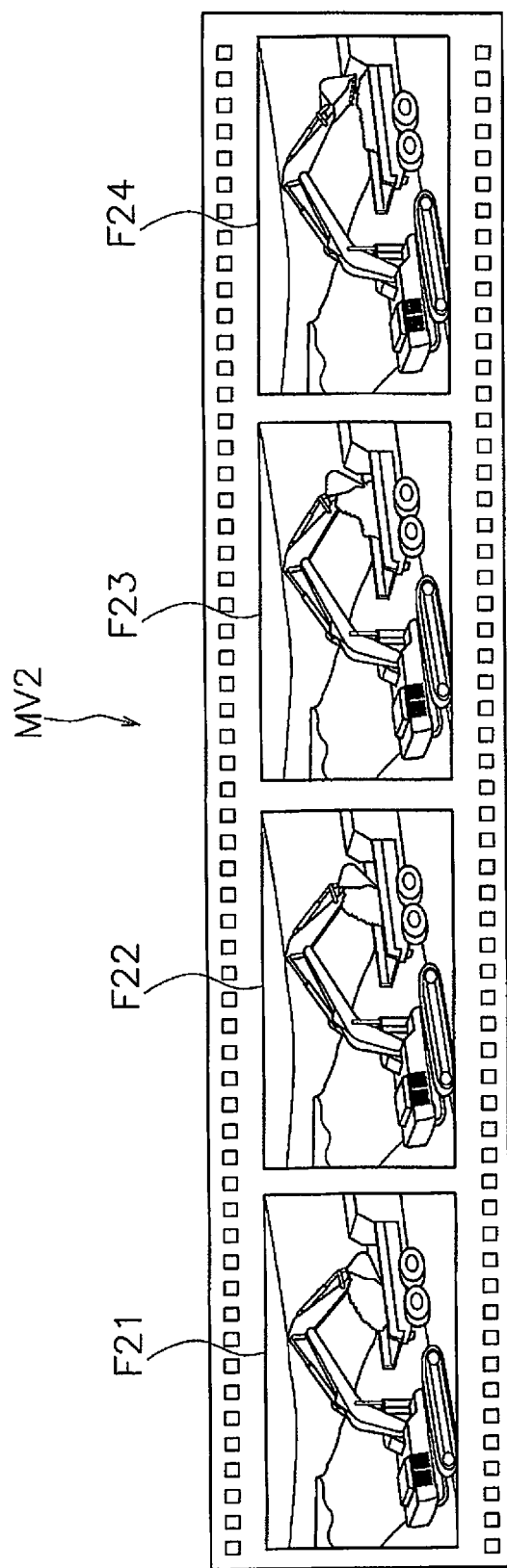
FIG. 9 is a diagram illustrating another example of a plurality of images included in video data.
Figure 10:
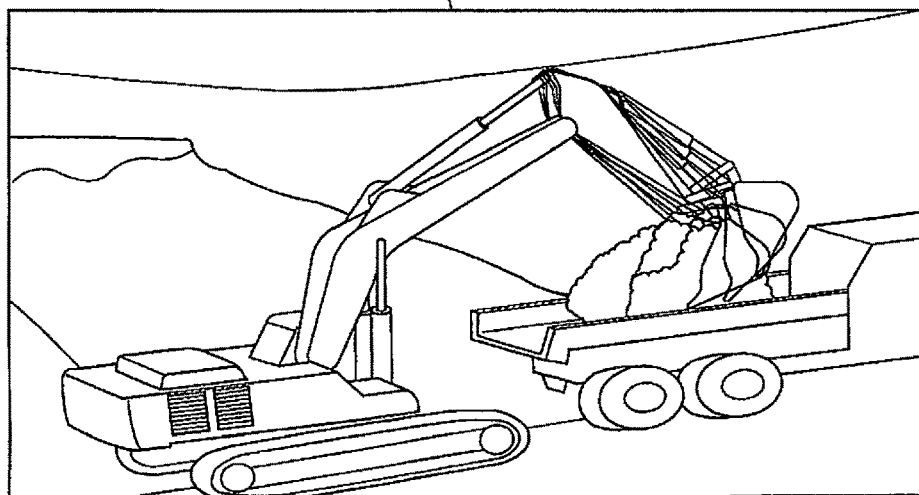
FIG. 10 is a diagram illustrating an example of a superimposed image obtained by superimposing first to third images included in the video data illustrated in FIG. 9.
Figure 11:
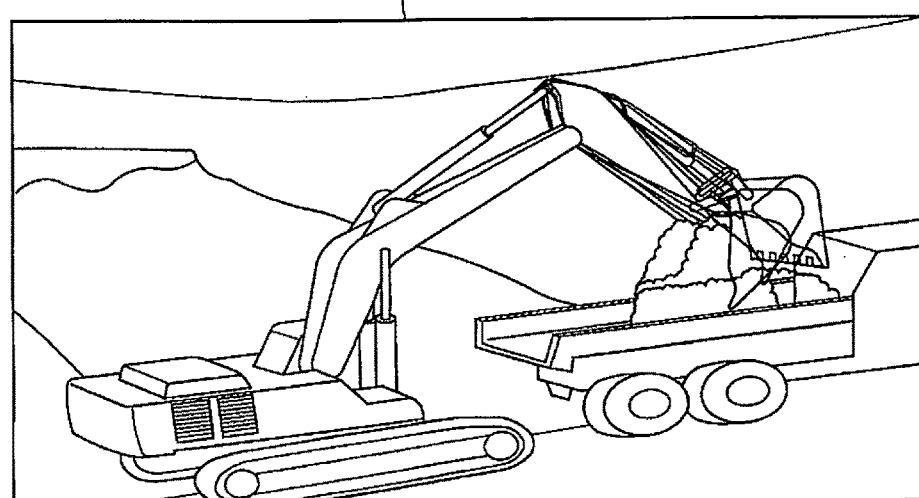
FIG. 11 is a diagram illustrating an example of a superimposed image obtained by superimposing second to fourth images included in the video data illustrated in FIG. 9.

FIG. 9 is a diagram illustrating a part of a plurality of images included in another example of the video data D12 (hereinafter referred to as "video data MV2"). The video data MV2 illustrated in FIG. 9 is obtained by shooting the work vehicle 1 during the discharging. FIG. 10 is a diagram illustrating an example of a superimposed image IM21 obtained by superimposing the first to third images F21 to F23 included in the video data MV2 illustrated in FIG. 9. FIG. 11 is a diagram illustrating an example of a superimposed image IM22 obtained by superimposing the second to fourth images F22 to F24 included in the video data MV2 illustrated in FIG. 9. As illustrated in FIGS. 10 and 11, in the superimposed images IM21 and IM22, a plurality of different postures of the work vehicle 1 during discharging are illustrated in one still image.

Figure 12:
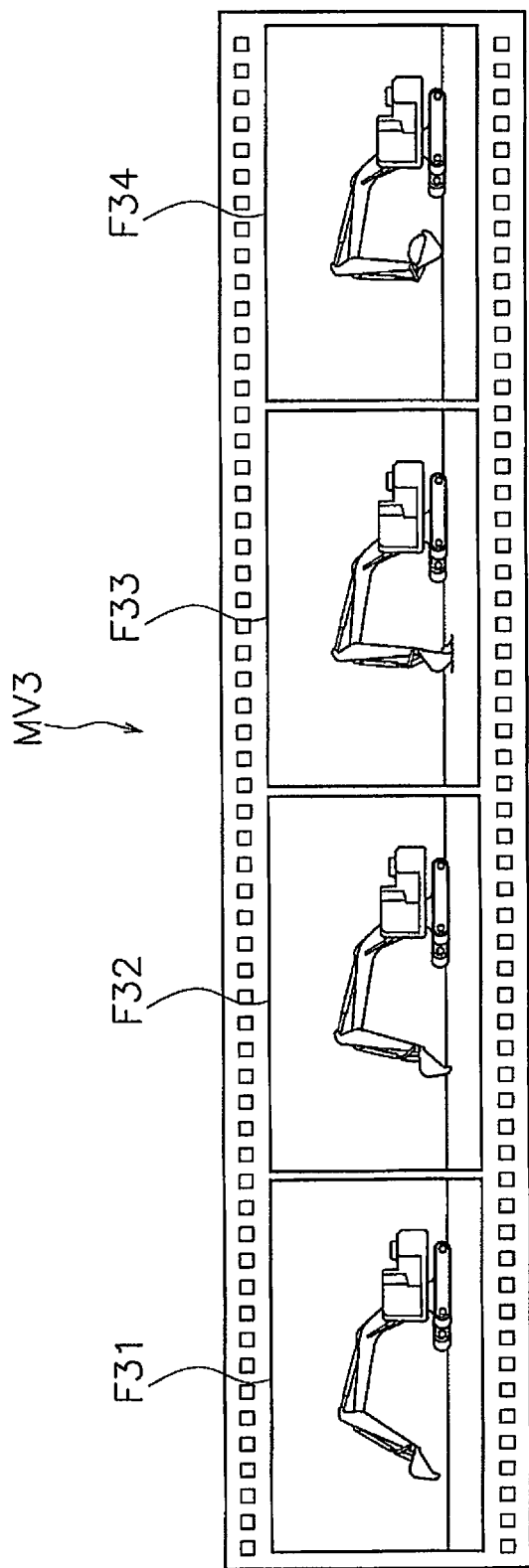
FIG. 12 is a diagram illustrating another example of a plurality of images included in video data.
Figure 13:
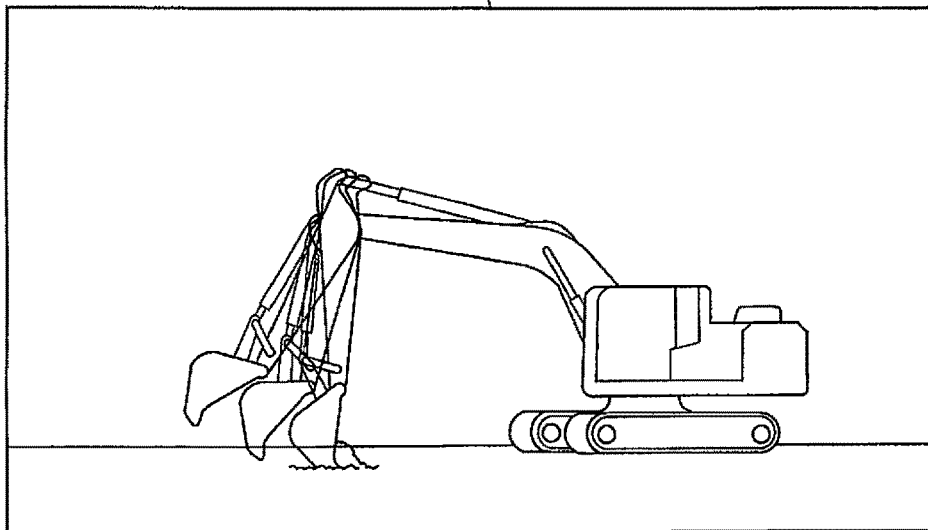
FIG. 13 is a diagram illustrating an example of a superimposed image obtained by superimposing first to third images included in the video data illustrated in FIG. 12.
Figure 14:
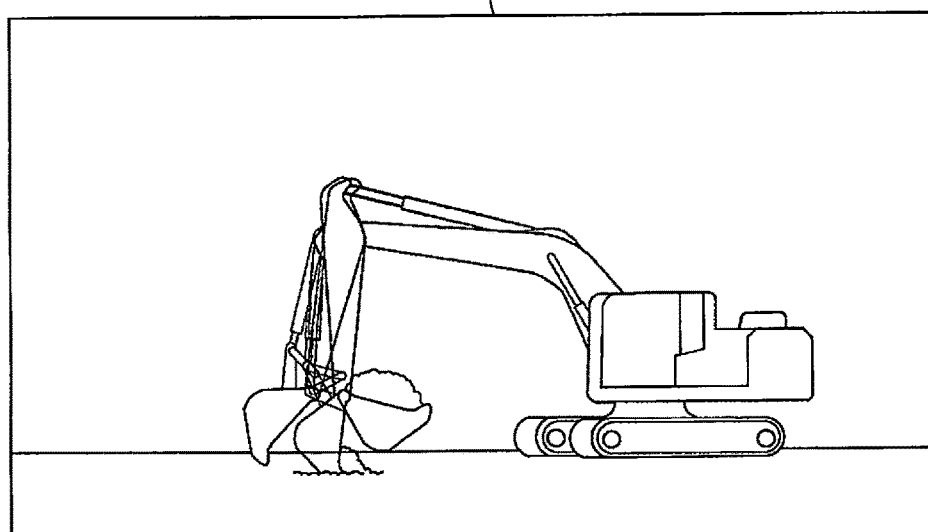
FIG. 14 is a diagram illustrating an example of a superimposed image obtained by superimposing second to fourth images included in the video data illustrated in FIG. 12.

FIG. 12 is a diagram illustrating a part of a plurality of images included in still another example of video data D11 (hereinafter referred to as "video data MV3"). The video data MV3 illustrated in FIG. 12 is obtained by shooting the work vehicle 1 being excavating. FIG. 13 is a diagram illustrating an example of a superimposed image IM31 obtained by superimposing the first to third images F31 to F33 included in the video data MV3 illustrated in FIG. 12. FIG. 14 is a diagram illustrating an example of a superimposed image IM32 obtained by superimposing the second to fourth images F32 to F34 included in the video data MV3 illustrated in FIG. 12. As illustrated in FIGS. 13 and 14, in the superimposed images IM31 and IM32, a plurality of different postures of the work vehicle 1 during excavation are illustrated in one still image.

In step S104, the computer 102 executes image classification using the trained classification model 111. The computer 102 executes the image classification based on the neural network 120 described above using the superimposed image generated in step S103 as input data to the classification model 111.

Figure 15:
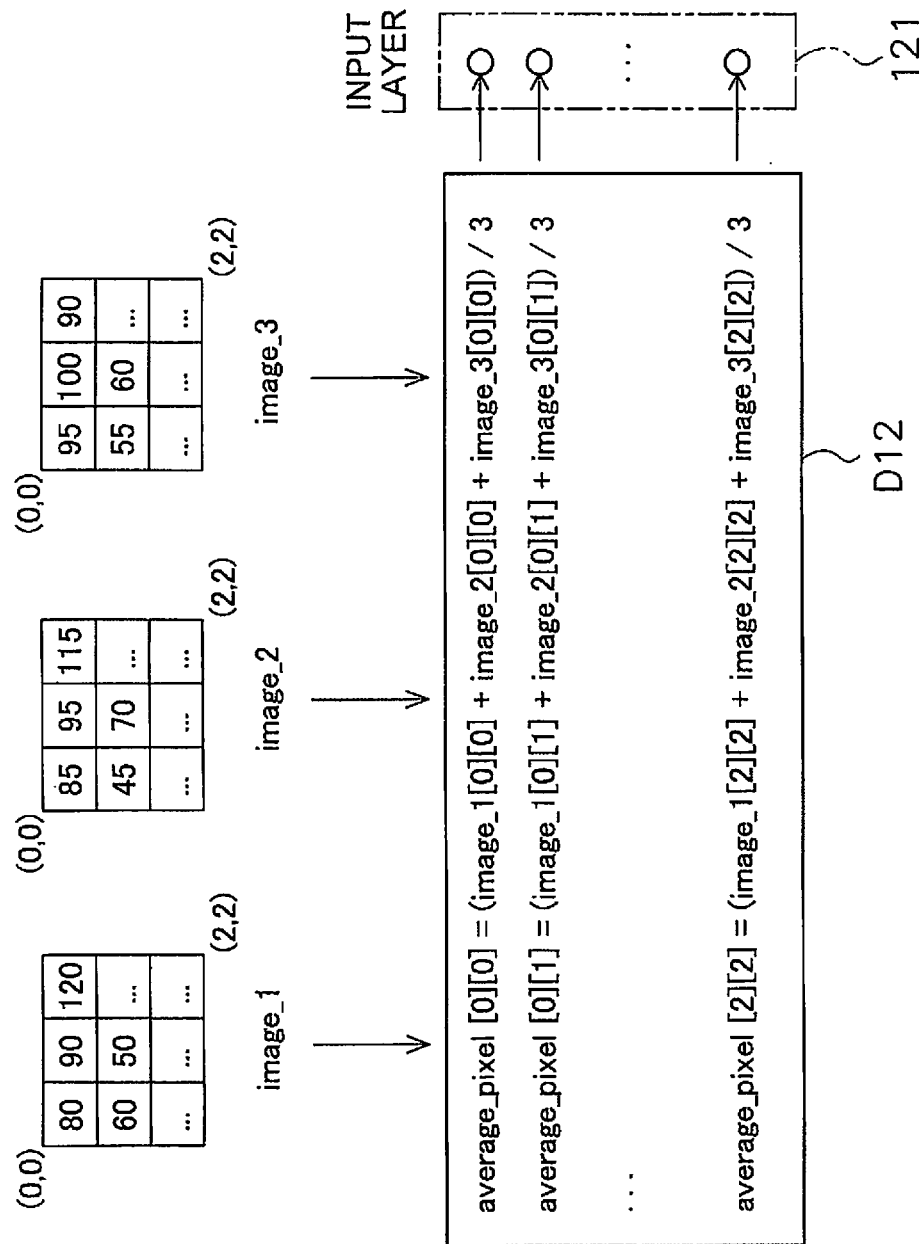
FIG. 15 is a diagram illustrating an example of a method for calculating a pixel value input to an input layer.

For example, the computer 102 inputs the pixel value included in the superimposed image to each neuron included in the input layer 121 of the neural network 120. FIG. 15 is a diagram illustrating an example of a method for calculating a pixel value input to the input layer 121. In FIG. 15, "image_1" indicates the pixel value of the first image. "Image_2" indicates the pixel value of the second image. "Image_3" indicates the pixel value of the third image. In addition, the numerical value illustrated by FIG. 15 is an only example, and is not limited to this.

As illustrated in FIG. 15, the computer 102 generates motion data input to the input layer 121 by combining the pixel values of the first to third images. Specifically, the computer 102 calculates an average value of pixel values of pixels corresponding to each other in the first to third images. The computer 102 inputs the calculated average value of each pixel (average_pixel [0] [0], etc.) to each neuron included in the input layer 121. The average value may be a weighted average. The correspondence between each pixel value and each neuron may be set as appropriate. Thereby, the computer 102 obtains the probability of each operation classification of the work vehicle 1 as the output data D13.

In the example of the hydraulic excavator described above, the operation classification of the work vehicle 1 includes "turning", "discharging", and "excavation". The controller obtains an output value indicating the probability of each classification of "turning", "discharging", and "excavation". The classification model 111 has been trained so that the output value of the classification of "turning" is high for the superimposed image showing turning as illustrated in FIGS. 7 and 8. The classification model 111 has been trained so that the output value of the classification of "discharging" becomes high for the superimposed image showing discharging as illustrated in FIGS. 10 and 11. The classification model 111 has been trained so that the output value of the classification of "excavation" becomes high for the superimposed image showing excavation as illustrated in FIGS. 13 and 14.

In step S105, the computer 102 determines the operation classification of the work vehicle 1. The computer 102 determines the operation classification of the work vehicle 1 based on the probability of each classification indicated by the output data D13. The computer 102 determines the classification having the highest probability as the operation of the work vehicle 1. Thereby, the computer 102 estimates the operation which the work vehicle 1 is performing.

In step S106, the computer 102 records the operation time of the work vehicle 1 in the classification determined in step S105. For example, when the work vehicle 1 is turning, the computer 102 determines the operation classification as "turning" and records the operation time of turning. The computer 102 may calculate the classification operation time from the number of frames used in the superimposed image.

In step S107, the computer 102 generates management data including the operation classification and the operation time. The computer 102 records management data in the storage device 104.

In the classification system 100 according to the present embodiment described above, the computer 102 determines the operation classification of the work vehicle 1 from the superimposed image. Therefore, the operation of the work vehicle 1 can be estimated using the artificial intelligence classification model 111 suitable for still image classification. Thereby, the operation of the work vehicle 1 can be easily and accurately determined by the computer 102 using artificial intelligence.

Classification system 100, it is possible to estimate an operation of the work vehicle 1 from video taken with the work vehicle 1 from the outside of the work vehicle 1. Therefore, the operation can be easily and accurately determined even for the work vehicle 1 that is not equipped with a dedicated device for the classification system 100 such as a specific sensor or a communication device.

In the classification system 100, the operation classification is determined from the video of the work vehicle 1, and the operation time of the classification is recorded as management data. Therefore, by capturing video of the work vehicle 1, the time study of the operation with the work vehicle 1 can be easily and automatically performed by the computer 102. In addition, by capturing video of a plurality of work vehicles 1 at the work site and generating management data by the classification system 100, time study of operations with the plurality of work vehicles 1 at the work site can be easily and automatically performed by the computer 102.

Figure 16:
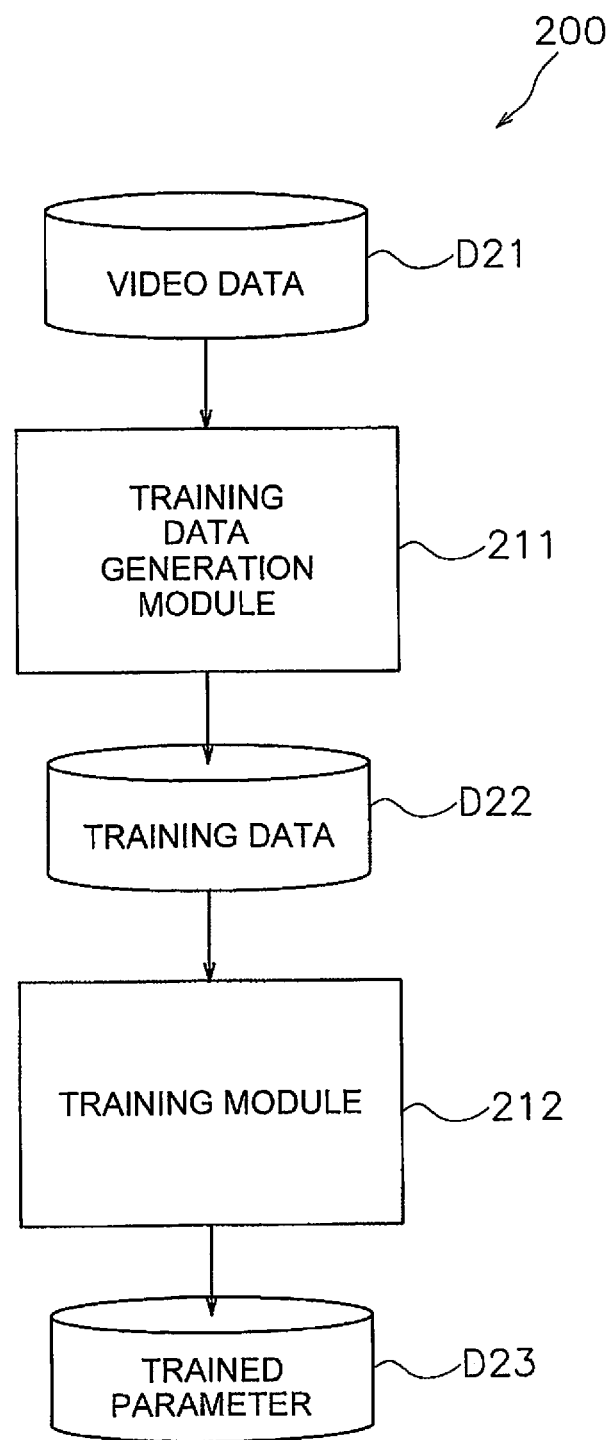
FIG. 16 is a schematic diagram showing a configuration of a learning system.

Next, a learning method for the classification model 111 according to the embodiment will be described. FIG. 16 is a diagram illustrating a learning system 200 that performs training of the classification model 111. The learning system 200 includes a training data generation module 211 and a training module 212.

The training data generation module 211 generates training data D22 from the video data D21 of a work vehicle. The training module 212 trains the classification model 111 using the training data D22 and optimizes the parameters of the classification model 111. The learning system 200 obtains the optimized parameter as the trained parameter D23.

Figure 17:
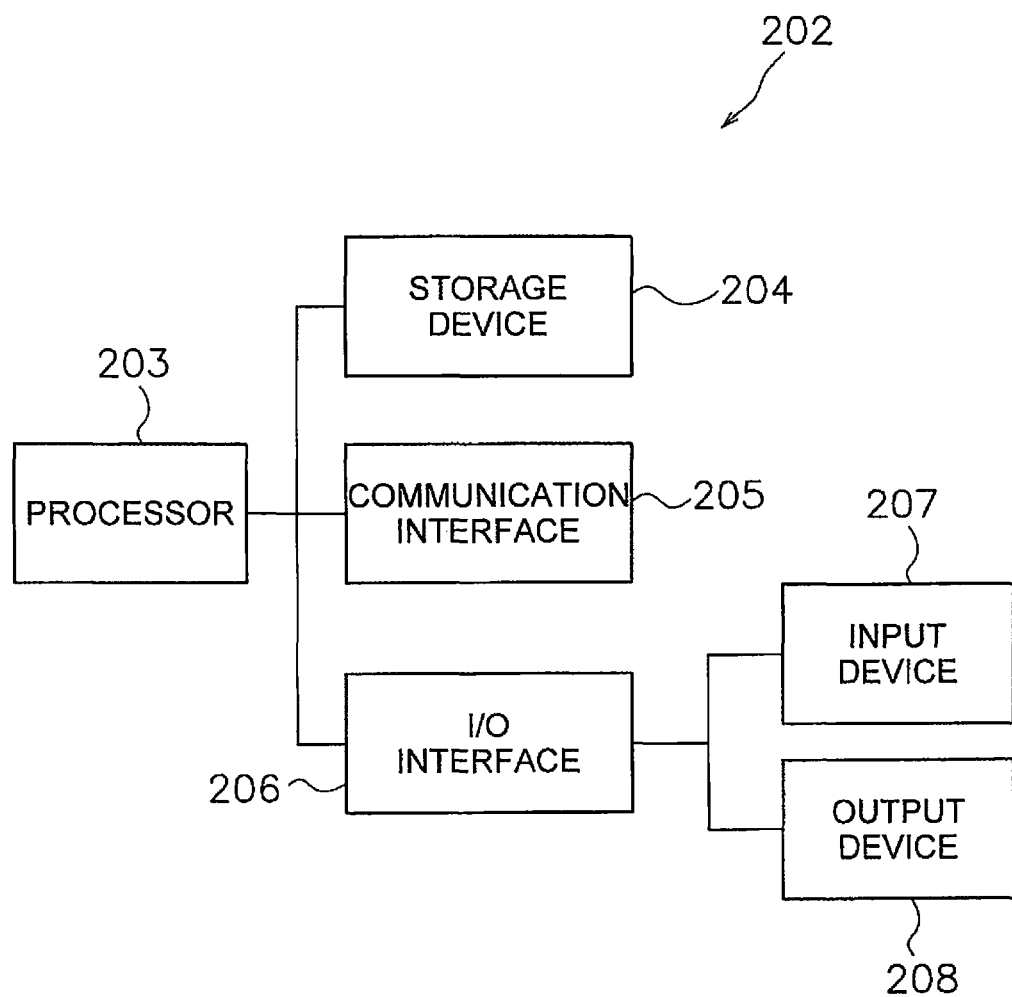
FIG. 17 is a schematic diagram illustrating a configuration of a computer in which a learning system is implemented.

FIG. 17 is a schematic diagram illustrating a configuration of a computer 202 that implements the learning system 200. As illustrated in FIG. 17, the computer 202 includes a processor 203, a storage device 204, a communication interface 205, an I/O interface 206, an input device 207, and an output device 208. The processor 203, storage device 204, communication interface 205, I/O interface 206, input device 207, and output device 208 of the computer 202 are substantially the same as the processor 103, storage device 104, communication interface 105, and I/O interface 106, the input device 107, and the output device 108 of the computer 102, and detailed description thereof is omitted.

The training data generation module 211 and the training module 212 are implemented in the computer 202. The training data generation module 211 and the training module 212 are stored in the storage device 204.

Figure 18:
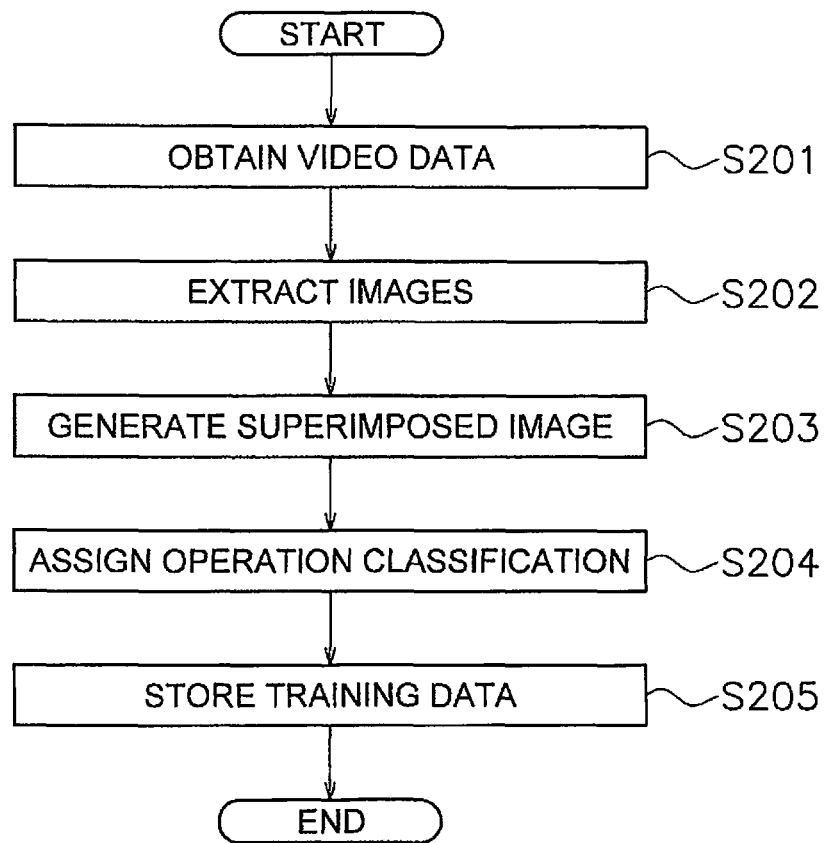
FIG. 18 is a flowchart showing a process for generating training data.

FIG. 18 is a flowchart showing processing executed by the computer 202 (processor 203) to generate training data D22. As illustrated in FIG. 18, in step S201, the computer 202 obtains video data D21 of a work vehicle. The computer 202 may obtain the video data D21 via a communication network. Alternatively, the computer 202 may obtain the video data D21 via an external recording medium.

In step S202, the computer 202 extracts a series of a plurality of images showing the operation of the work vehicle in time series from the video data D21. In step S203, the computer 202 generates a superimposed image by superimposing the extracted images. Since the processes in steps S202 and S203 are substantially the same as those in steps S102 and S103 described above, detailed description thereof is omitted.

In step S204, the computer 202 assigns the operation classification of the work vehicle 1 to the superimposed image, and generates training data. The assignment of the classification may be manually performed by a human using the input device 207. In that case, the computer 202 may assign the operation classification of the work vehicle to the superimposed image and generate training data based on the classification data indicating the classification input via the input device 207.

In step S205, the computer 202 stores the training data D22 in the storage device 204. The training data D22 includes the superimposed image generated in step S203 and the operation classification of the work vehicle assigned to the superimposed image in step S204.

The computer 202 generates a plurality of training data D22 from one video data D21 by repeating the processing from step S201 to step S205. Further, the computer 202 generates a plurality of training data D22 from the plurality of video data D21 by repeating the processing from step S201 to step S205.

Figure 19:
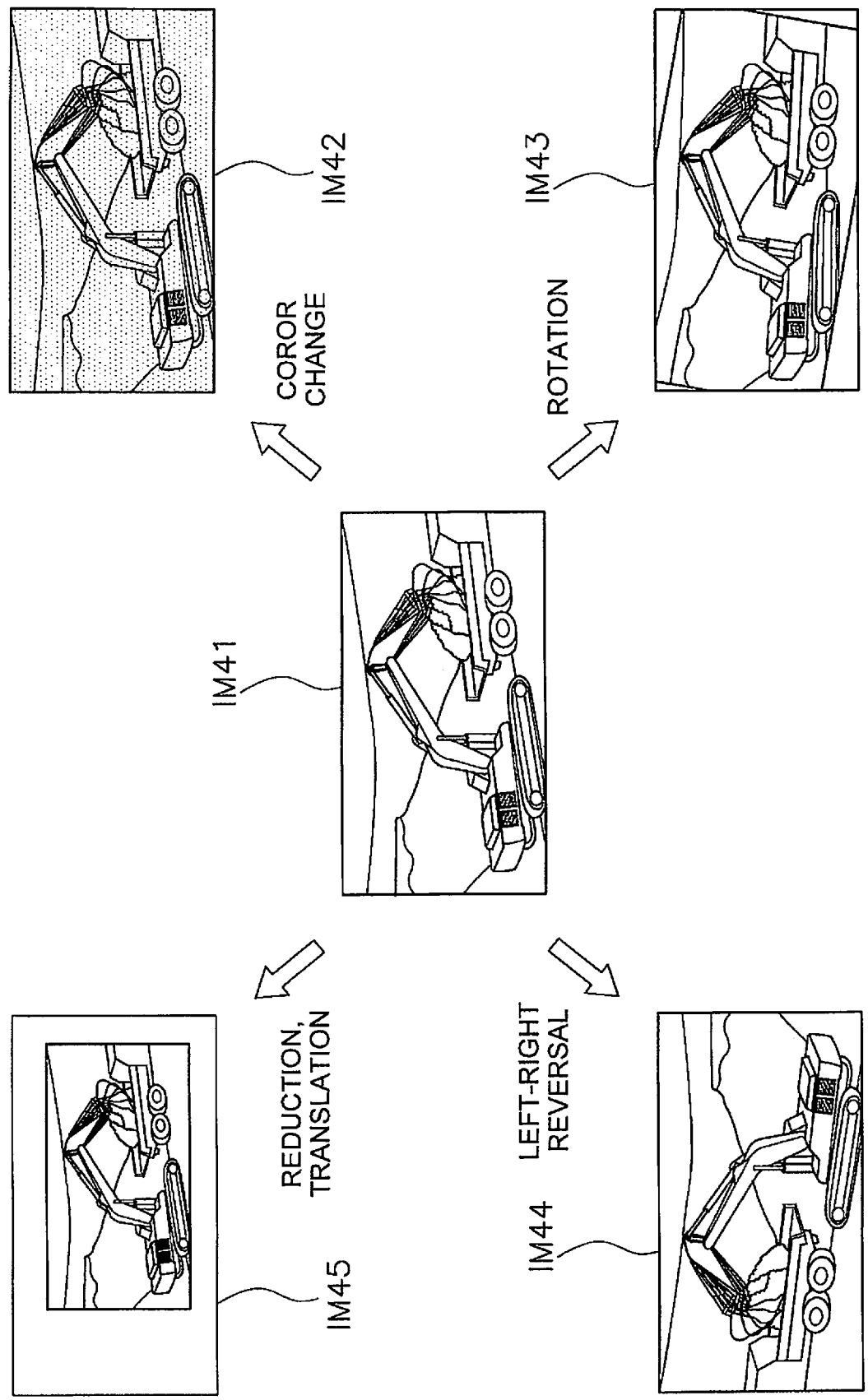
FIG. 19 is a diagram illustrating an example of a processed image.

As illustrated in FIG. 19, the computer 202 may use one superimposed image as an original image IM41, apply one or more of expansion, reduction, rotation, parallel movement, and color change with respect to the original image IM41, and whereby generate a plurality of processed images IM42 to IM45. The color change may be, for example, a change in saturation, brightness, or contrast. The computer 202 may assign the operation classification of the work vehicle 1 to each of the plurality of processed images IM42 to IM45 and store it as training data D22. Thereby, a large amount of various training data D22 can be prepared, and the learning effect of the classification model 111 can be improved.

Figure 20:
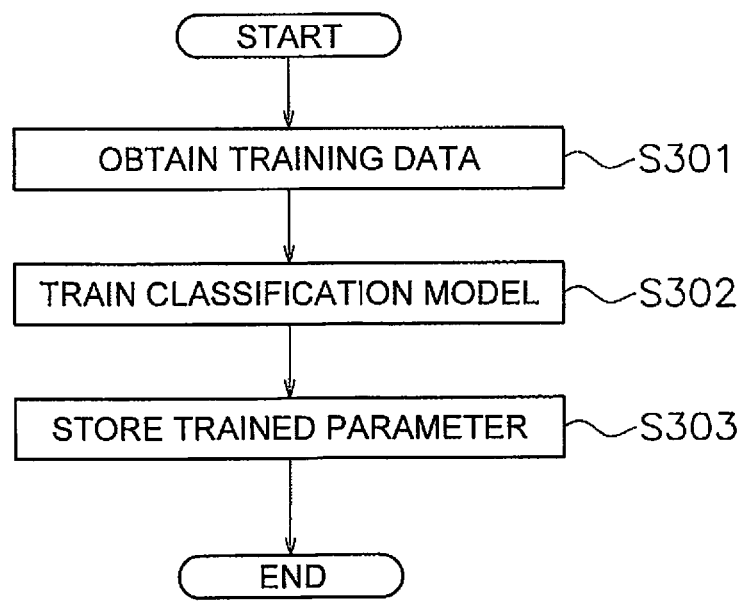
FIG. 20 is a flowchart showing a process for training a classification model by the training data.

FIG. 20 is a flowchart showing a process executed by the computer 202 (processor 203) in order to train the classification model 111 from the training data D22. As illustrated in FIG. 20, in step S301, the computer 202 obtains training data D22. As described above, the computer 202 obtains the training data D22 by generating the training data D22 from the video data D21.

However, the computer 202 may obtain training data D22 generated by another computer. In that case, the computer 202 may receive the training data D22 via a communication network. Alternatively, the computer 202 may receive the training data D22 via an external recording medium.

In step S302, the computer 202 trains the classification model 111 using the training data D22. The computer 202 trains the classification model 111 using the superimposed image included in the training data D22 as input data and the operation classification of the work vehicle 1 as teacher data.

For example, the computer 202 performs calculation processing in the forward propagation direction of the neural network 120 using each pixel value of each superimposed image as an input of the input layer 121. As a result, the computer 202 obtains an output value output from the output layer 123 of the neural network 120. Next, the computer 202 calculates an error between the output value output from the output layer 123 and the correct output value indicated by the classification assigned as the teacher data. The computer 202 calculates the error of the weight of the connection between the neurons and the error of the threshold value of each neuron from the calculated output value error by backpropagation. Then, the computer 202 updates the connection weight between the neurons and the threshold value of each neuron based on the calculated errors.

The computer 202 repeats the above processing for a plurality of superimposed images until the output value from the classification model 111 matches the value corresponding to the classification assigned to the superimposed image. Thereby, the parameters of the classification model 111 are optimized, and the classification model 111 can be trained.

Note that initial values of various parameters of the classification model 111 may be given by a template. Alternatively, the initial value of the parameter may be given manually by human input. When re-training the classification model 111, the computer 202 may prepare an initial value of the parameter based on the trained parameter D23 of the classification model 111 to be re-trained.

In step S303, the computer 202 stores the parameter optimized by training in the storage device 104 as the trained parameter D23. Thereby, the computer 202 ends the training of the classification model 111.

The computer 102 of the classification system 100 described above can obtain the trained classification model 111 by obtaining the classification model 111 and the trained parameter D23 from the computer 202 of the learning system 200.

Note that the computer 202 of the learning system 200 may update the trained parameter D23 by periodically performing the training of the classification model 111 described above. The computer 202 of the learning system 200 may transfer the updated trained parameter D23 to the computer 102 of the classification system 100. The computer 102 of the classification system 100 may update the parameters of the classification model 111 with the transferred trained parameter D23.

As mentioned above, although one embodiment of the present invention has been described, the present invention is not limited to the said embodiment, and various changes can be made without departing from the scope of the present invention.

The configuration of the classification system 100 and/or the learning system 200 may be changed. For example, the classification system 100 may include a plurality of computers. The processing by the classification system 100 described above may be executed by being distributed to a plurality of computers. For example, the generation of the superimposed image and the determination of the classification may be executed by different computers.

Figure 21:
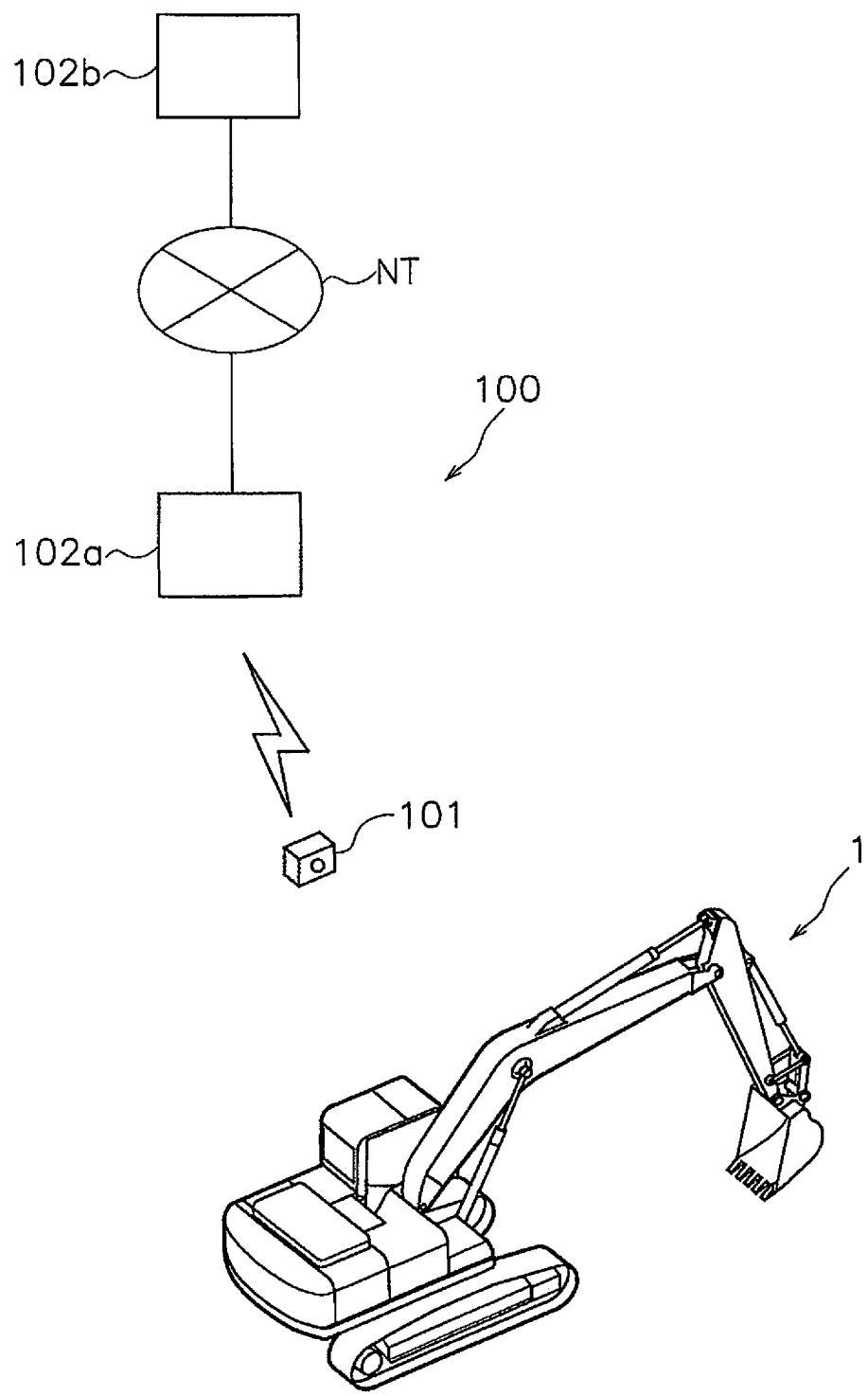
FIG. 21 is a diagram showing a classification system according to a modified example.

FIG. 21 is a diagram illustrating a classification system 100 according to a modification. As illustrated in FIG. 21, the classification system 100 may include a first computer 102a and a second computer 102b. The first computer 102a and the second computer 102b may be communicable with each other. For example, the first computer 102a and the second computer 102b may be communicable via the communication network NT.

The first computer 102a may obtain the above-described video data D11 and generate the superimposed image. The second computer 102b may obtain the superimposed image from the first computer 102a. The second computer 102b may perform image classification using the above-described classification model 111 and operation classification of the work vehicle 1. The first computer 102a may receive management data including the operation classification and the operation time from the second computer 102b.

The learning system 200 may include a plurality of computers. The processing by the learning system 200 described above may be executed in a distributed manner by a plurality of computers. For example, in the above-described embodiment, the computer 202 executes generation of training data and training of the classification model 111. However, generation of training data and training of the classification model 111 may be executed by different computers. That is, the training data generation module 211 and the training module 212 may be implemented on different computers.

The configuration of the computer 102 of the classification system 100 and/or the computer 202 of the learning system 200 may be changed. For example, the computer 102 may include a plurality of processors. The computer 202 may include a plurality of processors. At least a part of the processing described above is not limited to the CPU, and may be executed by another processor such as a GPU (Graphics Processing Unit). The above-described processing may be executed by being distributed to a plurality of processors.

In the above embodiment, the classification model 111 includes the neural network 120. However, the classification model 111 is not limited to a neural network, and may be a model that can classify still images with high accuracy using machine learning, such as a support vector machine.

The classification model 111 described above is not limited to a model trained by machine learning using the training data D21 described above, and may be a model generated using the trained model. For example, the classification model 111 may be another trained model (derivative model) in which the parameters are changed by further training using new data in the trained model, and the accuracy is further improved. Alternatively, the classification model 111 may be another trained model (ditillation model) trained based on a result obtained by repeatedly inputting and outputting data to the trained model.

Figure 22:
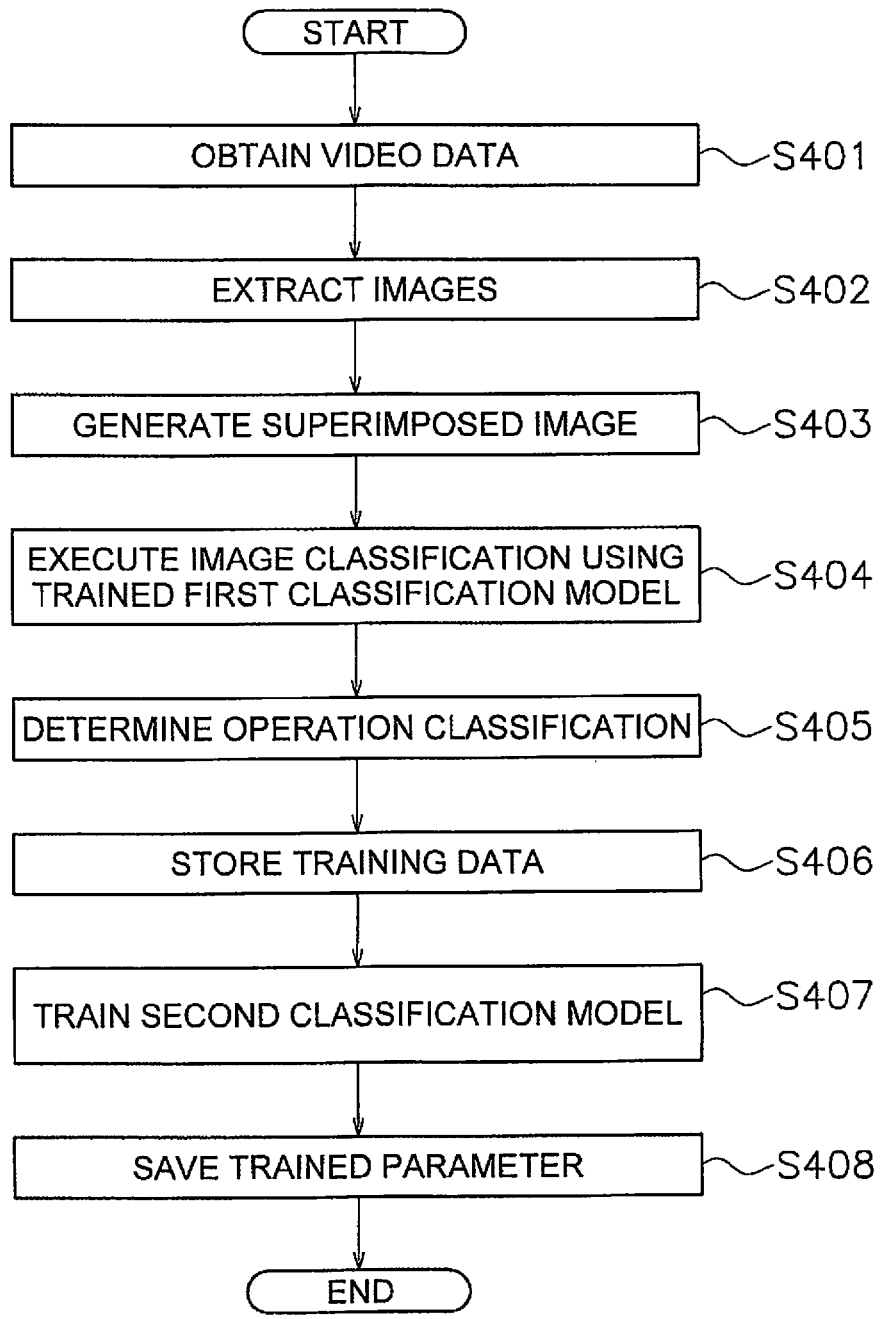
FIG. 22 is a flowchart showing a process for generating a distillation model.

FIG. 22 is a flowchart showing processing executed by the computer 202 (processor 203) to generate a distillation model. As illustrated in FIG. 22, in steps S401 to S403, the computer 202 generates a superimposed image from video data. Since the processes in steps S401 to S403 are the same as those in steps S201 to S203 described above, detailed description thereof is omitted.

In step S404, the computer 202 executes image classification using the trained first classification model. The computer 202 executes image classification based on the neural network, using the superimposed image generated in step S403 as input data to the first classification model. In step S405, the computer 202 determines the operation classification of the work vehicle 1. The computer 202 determines the operation classification of the work vehicle 1 based on the image classification based on the first classification model. The processes in steps S404 and S405 are the same as the processes in steps S104 and S105 described above.

In step S406, the computer 202 stores the superimposed image generated in step S403 and the operation classification of the work vehicle 1 determined in step S405 in the storage device 204 as training data D22.

In step S407, the computer 202 trains the second classification model using the training data D22. In step S408, the computer 202 saves the parameter optimized by training in the storage device 104 as the trained parameter D23. The processes in steps S407 and S408 are the same as the processes in steps S302 and S303 described above. Note that the computer 202 may train the second classification model using the training data D22 generated by another computer.

By training the second classification model (distillation model) as described above, the computer 102 can use the second classification model that is simpler than the first classification model to determine the operation classification of the work vehicle 1. Thereby, the load of the computer 102 for determining the operation classification of the work vehicle 1 can be reduced.

Figure 23:
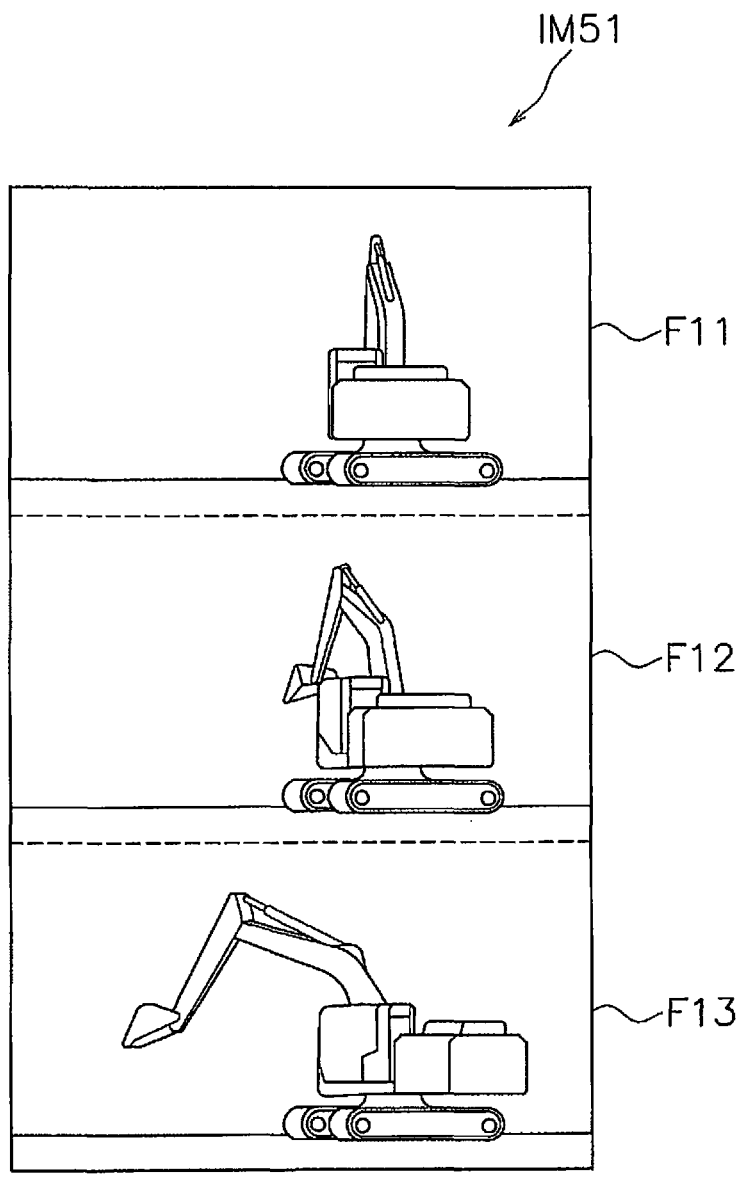
FIG. 23 is a diagram illustrating an example of motion data according to a modification.
Figure 24:
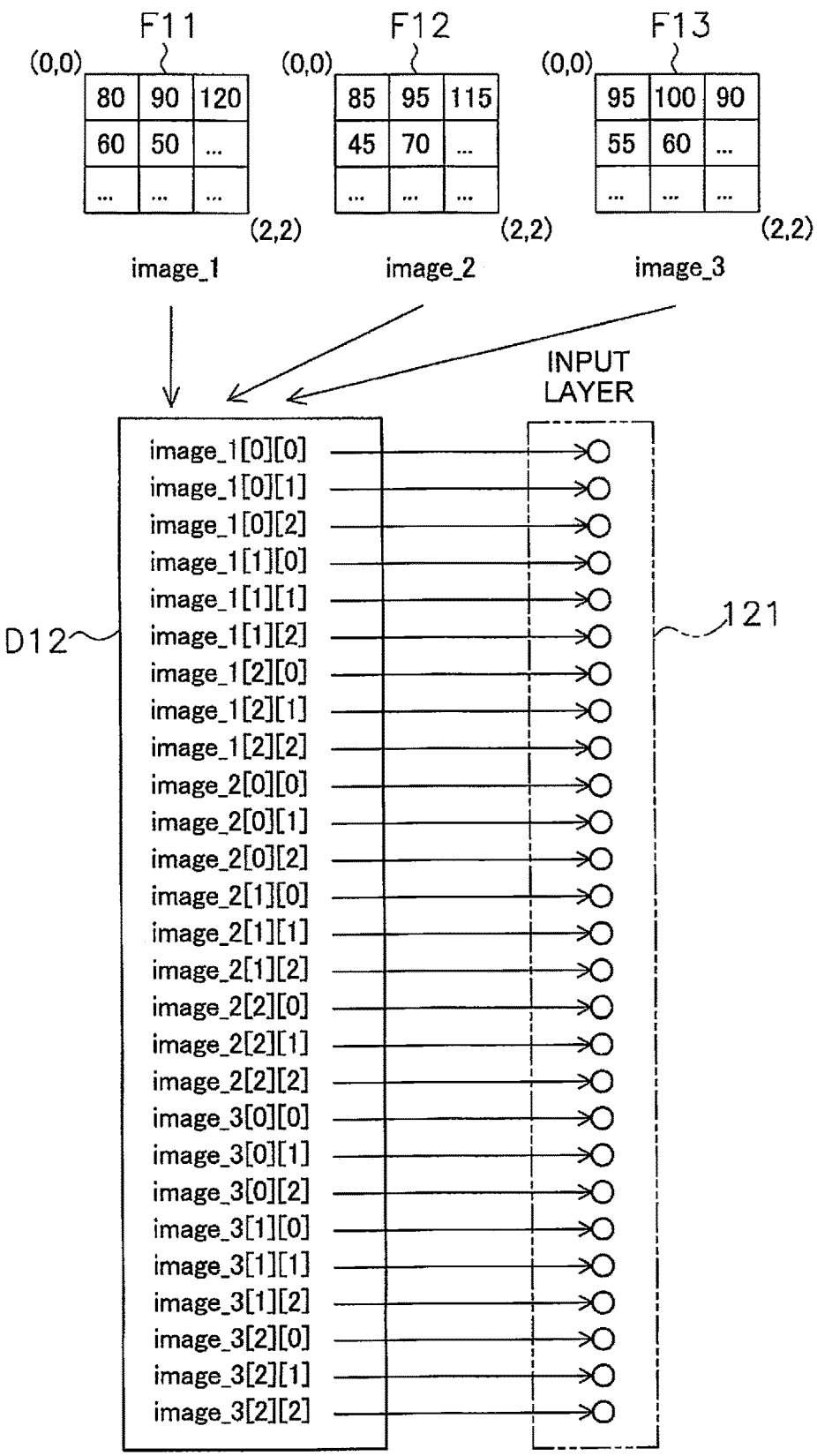
FIG. 24 is a diagram illustrating an example of a calculation method of motion data according to a modified example.

The motion data is not limited to the superimposed image and may be other data as long as it is data indicating a motion change of the work vehicle generated from a plurality of images. The motion data may be data indicating a group of images included in a plurality of images. FIG. 23 is a diagram showing motion data according to the modification. As illustrated in FIG. 23, the motion data may be a connected image IM51 obtained by connecting a plurality of images. The connected image IM51 is an image obtained by serially connecting the first to third images F11 to F13 included in the video data MV1. In this case, as illustrated in FIG. 24, the computer 102 may serially input the pixel values of the first to third images F11 to F13 to the input layer 121.

In such a modification, the operation of the work vehicle 1 can be easily and accurately determined by the computer 102 using artificial intelligence, as in the above-described embodiment. However, since a lot of data such as the background is input, data unnecessary for the operation determination increases. Therefore, in the modified example, the operation determination accuracy is inferior compared to the above-described embodiment using the superimposed image. In other words, in the above-described embodiment, unnecessary data can be reduced by using the superimposed image, and thereby determination accuracy can be improved.

The motion data may include values obtained from pixel values of a plurality of images, and is not limited to images. For example, in FIG. 15, the computer 102 may calculate the average value "average_pixel [0] [0]" of the pixel values, immediately input the calculated value to the input layer 121, and initialize "average_pixel [0] [0]". The computer 102 may repeat the same processing until "average_pixel [2] [2]". In this case, the computer 102 does not generate an image as the motion data, but can generate a value obtained by combining pixel values of a plurality of images as the motion data and input it to the input layer 121.

The motion data may be obtained by omitting a common part in a plurality of images. For example, pixel values indicating the background that are commonly included in a plurality of images may be omitted from the motion data. The computer 102 may determine a reference image from among a plurality of images, and may calculate a difference between the other images and the reference image. The computer 102 may generate motion data from this difference and input it to the input layer 121.

The method of generating the superimposed image or the connected image may be changed. For example, in the above-described embodiment, the superimposed image is generated by superimposing the three-frame images in the video data D11 and D21. However, the number of frames in the superimposed image is not limited to three, and may be less than three or more than three.

The computers 102 and 202 may extract a continuous frame image and generate a superimposed image or a connected image. Alternatively, the computers 102 and 202 may extract an image by skipping a part of consecutive frames. For example, the computers 102 and 202 may extract an image by skipping one or more frames from a plurality of consecutive frames.

The computers 102 and 202 may generate a superimposed image or a connected image by converting a plurality of images to gray scale. The computers 102 and 202 may change the darkness of some of the plurality of images. That is, the computers 102 and 202 may generate a superimposed image or a connected image from a plurality of images having different densities. The computers 102 and 202 may generate a superimposed image or a connected image by cutting out a part of the extracted image.

The work vehicle is not limited to a hydraulic excavator, and may be another vehicle such as a bulldozer, a wheel loader, a grader, or a dump truck. The classification model 111, the trained parameter D23, and/or the training data D22 may be prepared for each type of the work vehicle. Alternatively, the classification model 111, the trained parameter D23, and/or the training data D22 may be common to a plurality of types of the work vehicle. In that case, the classification model 111 may estimate the type of the work vehicle together with the operation of the work vehicle.

A part of the processing described above may be omitted or changed. For example, the process for recording the operation time may be omitted. The process of generating management data may be omitted.

According to the present invention, it is possible to easily and accurately determine the operation of a work vehicle using artificial intelligence.

The invention claimed is:

1. A method performed by a computer, the method comprising:
    obtaining motion data indicating a motion change of a work vehicle, the motion data being generated from a plurality of still images indicating the work vehicle performing a prescribed operation in time series, the plurality of still images showing the work vehicle in a plurality of different postures during performance of the prescribed operation, the motion data being a still image generated by superimposing or connecting the plurality of still images; and
    determining an operation classification of the work vehicle from the motion data by performing image classification using a trained classification model, the operation classification corresponding to the prescribed operation performed by the work vehicle, the operation classification being one of a plurality of classifications, each of the plurality of classifications corresponding to a different operation performed by the work vehicle and being determinable from the motion data.

2. The method according to claim 1, wherein
the motion data is obtained by combining pixel values of the plurality of still images.

3. The method according to claim 1, wherein
the motion data indicates a group of images included in the plurality of still images.

4. The method according to claim 1, wherein
the motion data is represented by an average value of pixel values corresponding to each other in the plurality of still images,
the motion data is obtained by calculating an average value of pixel values of corresponding pixels in each of the plurality still images.

5. The method according to claim 1, further comprising:
obtaining a video of the work vehicle in operation;
extracting the plurality of still images from the video; and
generating the motion data from the extracted plurality of still images.

6. The method according to claim 5, wherein
the extracting the plurality of still images includes extracting the images by skipping a part of consecutive frames included in the video.

7. The method according to claim 5, wherein
the generating the motion data includes changing a portion of the plurality of still images to a darkness different from the other images.

8. The method according to claim 1, wherein
the generating the motion data includes gray scaling the plurality of still images.

9. The method according to claim 1, further comprising:
recording an operation time of the work vehicle indicated by the classification; and
generating management data including the classification and the operation time.

10. The method according to claim 1, wherein
the classification model includes a neural network.

11. The method according to claim 10, wherein
the neural network includes an input layer and an output layer, the input layer having a number of neurons corresponding to a number of pixels in the plurality of still images and the output layer having a number of neurons corresponding to a number of the plurality of classifications.

12. The method according to claim 1, wherein
the plurality of classifications corresponds to operations including at least one of turning, discharging, and excavating.

13. The method according to claim 1, wherein
the motion data is obtained by calculating an average value of pixel values of corresponding pixels in each of the plurality still images,
a plurality of output values is obtained, each of the output values being a probability that the motion data indicates each of the plurality of classifications, respectively, and
the operation classification is determined by determining which of the output values is highest.

14. The method according to claim 1, further comprising
determining a plurality of output values, each of the output values being a probability that the motion data indicates each of the plurality of classifications, respectively, and
the operation classification is determined by determining which of the output values is highest.

15. A system comprising:
a trained classification model; and
a processor programmed to
    obtain motion data indicating a motion change of a work vehicle, the motion data being generated from a plurality of still images showing the work vehicle performing a prescribed operation in time series, the plurality of still images showing the work vehicle in a plurality of different postures during performance of the prescribed operation, the motion data being a still image generated by superimposing or connecting the plurality of still images, and determine an operation classification of the work vehicle from the motion data by performing image classification using the trained classification model, the operation classification corresponding to the prescribed operation performed by the work vehicle, the operation classification being one of a plurality of classifications, each of the plurality of classifications corresponding to a different operation performed by the work vehicle and being determinable from the motion data.

16. The system according to claim 15, further comprising:

a camera configured to shoot a video of the work vehicle, and the processor programmed to obtain the video from the camera, extract the plurality of still images from the video, and generate the motion data from the plurality of extracted images.

17. The system according to claim 15, wherein the processor is further programmed to record an operation time of the work vehicle indicated by the classification, and generate management data including the classification and the operation time.

18. The system according to claim 15, wherein the classification model includes a neural network.

19. A producing method for a trained classification model, the producing method comprising:

obtaining training data including motion data indicating a motion change of a work vehicle, the motion data being generated from a plurality of still images indicating the work vehicle performing a prescribed operation in time series, the plurality of still images showing the work vehicle in a plurality of different postures during performance of the prescribed operation, the motion data indicating a still image generated by superimposing or connecting the plurality of still images, and an operation classification of the work vehicle assigned to the motion data, the operation classification corresponding to the prescribed operation performed by the work vehicle, the operation classification being one of a plurality of classifications, each of the plurality of classifications corresponding to a different operation performed by the work vehicle and being determinable from the motion data; and training a classification model with the training data.

20. The producing method according to claim 19, further comprising:

obtaining a video of the work vehicle in operation;

extracting the plurality of still images from the video;

generating the motion data from the plurality of still images; and assigning the operation classification of the work vehicle to the motion data.

21. The method according to claim 20, wherein the classification model is configured to generate output values, each of the output values indicating a probability that the motion data indicates each of the plurality of classifications, respectively, and the determining the operation classification of the work vehicle includes determining which of the output values is highest.

22. A training data for training a classification model, the training data comprising:

motion data indicating a motion change of a work vehicle, the motion data being generated from a plurality of still images indicating the work vehicle performing a prescribed operation in time series, the plurality of still images showing the work vehicle in a plurality of different postures during performance of the prescribed operation, the motion data being a still image generated by superimposing or connecting the plurality of still images; and an operation classification of the work vehicle assigned to the motion data, the operation classification corresponding to the prescribed operation performed by the work vehicle, the operation classification being one of a plurality of classifications, each of the plurality of classifications corresponding to a different operation performed by the work vehicle and being determinable from the motion data.

23. The training data according to claim 22, wherein the still image is generated by superimposing the plurality of still images, and the superimposed image includes an original image, and a plurality of processed images obtained by performing one or more of reduction, enlargement, rotation, translation, left-right reversal, and color change on the original image.

24. A producing method for training data to training a classification model, the producing method comprising:

obtaining a plurality of still images showing a work vehicle performing a prescribed operation in time series, the plurality of still images showing the work vehicle in a plurality of different postures during performance of the prescribed operation;

generating motion data indicating a motion change of the work vehicle from the plurality of still images, the motion data being a still image generated by superimposing or connecting the plurality of still images; and obtaining an operation classification of the work vehicle assigned to the motion data, the operation classification corresponding to the prescribed operation performed by the work vehicle, the operation classification being one of a plurality of classifications, each of the plurality of classifications corresponding to a different operation performed by the work vehicle and being determinable from the motion data.

25. The producing method according to claim 24, further comprising:

obtaining a video of the work vehicle, the obtaining the plurality of still images including extracting the plurality of still images from the video.

26. A producing method for a trained classification model, the producing method comprising:

obtaining motion data indicating a motion change of a work vehicle, the motion data being generated from a plurality of still images indicating the work vehicle performing a prescribed operation in time series, the plurality of still images showing the work vehicle in a plurality of different postures during performance of the prescribed operation, the motion data being a still image generated by superimposing or connecting the plurality of still images;

determining an operation classification of the work vehicle from the motion data by performing image classification using a trained first classification model, the operation classification corresponding to the prescribed operation performed by the work vehicle, the operation classification being one of a plurality of classifications, each of the plurality of classifications corresponding to a different operation performed by the work vehicle and being determinable from the motion data; and training a second classification model with training data including the motion data and the determined operation classification of the work vehicle.

* * * * *

(12) EX PARTE REEXAMINATION CERTIFICATE (230th)
Ex Parte Reexamination Ordered under 35 U.S.C. 257

United States Patent
Aizawa

(10) Number: US 11,556,739 C1
(45) Certificate Issued: Sep. 29, 2023

(54) METHOD FOR ESTIMATING OPERATION OF WORK VEHICLE, SYSTEM, METHOD FOR PRODUCING TRAINED CLASSIFICATION MODEL, TRAINING DATA, AND METHOD FOR PRODUCING TRAINING DATA

(71) Applicant: KOMATSU LTD., Tokyo (JP)

(72) Inventor: Masanori Aizawa, Tokyo (JP)

(73) Assignee: Komatsu Ltd.

Supplemental Examination Request:
No. 96/000,431, Apr. 24, 2023

Reexamination Certificate for:
Patent No.: 11,556,739
Issued: Jan. 17, 2023
Appl. No.: 16/500,028
PCT Filed: Oct. 26, 2018
PCT No.: PCT/JP2018/039830
§ 371 (c)(1),
(2) Date: Oct. 1, 2019
PCT Pub. No.: WO2019/093152
PCT Pub. Date: May 16, 2019

(30) Foreign Application Priority Data

Nov. 10, 2017 (JP) .................. 2017-217287

(51) Int. Cl.
*G06V 20/20* (2022.01)
*G06V 20/40* (2022.01)
*G06V 20/56* (2022.01)
*G06V 20/00* (2022.01)
*G06V 10/82* (2022.01)
*G06F 18/214* (2023.01)
*G06V 40/20* (2022.01)

(52) U.S. Cl.
CPC ............ *G06V 20/38* (2022.01); *G06F 18/214* (2023.01); *G06V 10/82* (2022.01); *G06V 20/20* (2022.01); *G06V 20/41* (2022.01); *G06V 20/56* (2022.01); *G06V 40/20* (2022.01)

(58) Field of Classification Search
None
See application file for complete search history.

(56) References Cited

To view the complete listing of prior art documents cited during the supplemental examination proceeding and the resulting reexamination proceeding for Control Number 96/000,431, please refer to the USPTO's Patent Electronic System.

*Primary Examiner* — Adam L Basehoar

(57) ABSTRACT

A method is performed by a computer. The method includes obtaining action data indicating a motion change of a work vehicle, and determining an operation classification of the work vehicle from the motion data by performing image classification using a trained classification model. The motion data is generated from a plurality of images indicating the work vehicle in operation in time series.

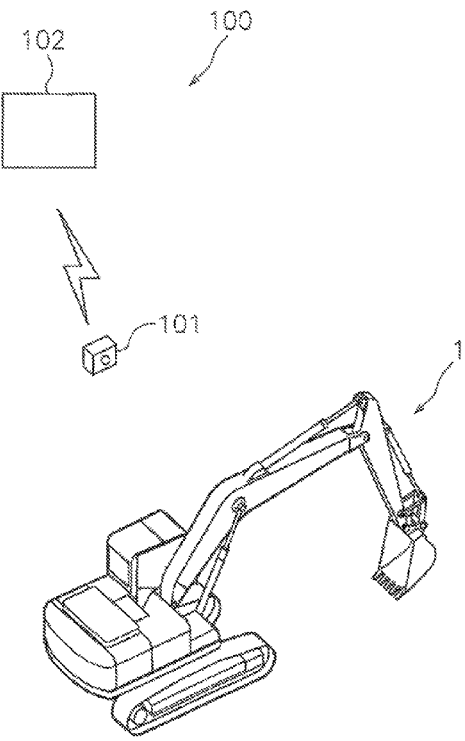

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 15 and 26 is confirmed.

Claims 22 and 23 are cancelled.

Claims 19 and 24 are determined to be patentable as amended.

Claims 2-14, 16-18, 20, 21 and 25 were not reexamined.

19. A producing method for a trained classification model, the producing method comprising:
  obtaining training data including
    motion data indicating a motion change of a work vehicle, the motion data being generated from a plurality of still images indicating the work vehicle performing a prescribed operation in time series, the plurality of still images showing the work vehicle in a plurality of different postures during performance of the prescribed operation, the motion data [indicating] *being* a still image generated by superimposing or connecting the plurality of still images, and
    an operation classification of the work vehicle assigned to the motion data, the operation classification corresponding to the prescribed operation performed by the work vehicle, the operation classification being one of a plurality of classifications, each of the plurality of classifications corresponding to a different operation performed by the work vehicle and being determinable from the motion data; and
  training a classification model with the training data.

24. A producing method for training data to [training] *train* a classification model, the producing method comprising:
  obtaining a plurality of still images showing a work vehicle performing a prescribed operation in time series, the plurality of still images showing the work vehicle in a plurality of different postures during performance of the prescribed operation;
  generating motion data indicating a motion change of the work vehicle from the plurality of still images, the motion data being a still image generated by superimposing or connecting the plurality of still images; and
  obtaining an operation classification of the work vehicle assigned to the motion data, the operation classification corresponding to the prescribed operation performed by the work vehicle, the operation classification being one of a plurality of classifications, each of the plurality of classifications corresponding to a different operation performed by the work vehicle and being determinable from the motion data.

\* \* \* \* \*